(12) United States Patent
Yun

(10) Patent No.: US 12,144,085 B2
(45) Date of Patent: Nov. 12, 2024

(54) COOKING DEVICE AND CONTROL METHOD THEREFOR

(71) Applicant: SAMSUNG ELECTRONICS CO. LTD., Gyeonggi-do (KR)

(72) Inventor: Chang Sun Yun, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 608 days.

(21) Appl. No.: 16/755,374

(22) PCT Filed: Sep. 4, 2018

(86) PCT No.: PCT/KR2018/010293
§ 371 (c)(1),
(2) Date: Apr. 10, 2020

(87) PCT Pub. No.: WO2019/050254
PCT Pub. Date: Mar. 14, 2019

(65) Prior Publication Data
US 2020/0329535 A1 Oct. 15, 2020

(30) Foreign Application Priority Data

Sep. 5, 2017 (KR) .................. 10-2017-0113482

(51) Int. Cl.
H05B 6/06 (2006.01)
H05B 6/12 (2006.01)

(52) U.S. Cl.
CPC .......... *H05B 6/065* (2013.01); *H05B 6/1272* (2013.01)

(58) Field of Classification Search
CPC .......... F24C 7/06; F24C 7/08; H05B 2213/03; H05B 2213/05; H05B 6/02; H05B 6/06;
(Continued)

(56) References Cited

U.S. PATENT DOCUMENTS

2011/0240632 A1 10/2011 Anton Falcon et al.
2012/0103971 A1* 5/2012 Oh .................. H05B 6/062
219/465.1

FOREIGN PATENT DOCUMENTS

EP 2252130 11/2010
EP 2252130 A1 * 11/2010 ............. H05B 6/062
(Continued)

OTHER PUBLICATIONS

Extended European Search Report dated Oct. 9, 2020 in European Patent Application No. 18853445.7.
(Continued)

*Primary Examiner* — Janie M Loeppke
*Assistant Examiner* — Theodore J Evangelista
(74) *Attorney, Agent, or Firm* — STAAS & HALSEY LLP

(57) ABSTRACT

A cooking apparatus includes a cooking plate including a cooking area divided into a plurality of sub-areas; a plurality of induction heating coil groups corresponding to the plurality of sub-areas; a plurality of drive assemblies configured to supply a driving current to each of the plurality of induction heating coil groups; a user interface configured to receive a compartment command that divides the cooking area of the cooking plate into the plurality of sub-areas. The cooking apparatus includes a sub-assembly configured to determine an induction heating coil group corresponding to the sub-area in which a cooking vessel is placed when the compartment command is input; and a controller configured to control a drive assembly to supply a respective driving current to the determined induction heating coil group such that a preset target temperature is distributed to an induction heating coil overlapping the sub-area in which the cooking vessel is placed.

19 Claims, 30 Drawing Sheets

(58) Field of Classification Search
CPC .......... H05B 6/062; H05B 6/065; H05B 6/12;
H05B 6/1272; H05B 6/36; Y02B 40/00
See application file for complete search history.

(56) References Cited

FOREIGN PATENT DOCUMENTS

| | | | |
|---|---|---|---|
| EP | 2688365 | 1/2014 | |
| EP | 2688365 A1 * | 1/2014 | ............. H05B 6/062 |
| KR | 10-2008-0067278 | 7/2008 | |
| KR | 10-2012-0114830 | 10/2012 | |
| KR | 10-2016-0063230 | 6/2016 | |
| KR | 10-1718878 | 4/2017 | |
| WO | 2016/139942 | 9/2016 | |

OTHER PUBLICATIONS

International Search Report dated Jan. 4, 2019 from International Application No. PCT/KR2018/010293, 5 pages.
Korean Notice of Patent Allowance for Korean Patent Application No. 10-2017-0113482 dated Nov. 26, 2021.
Korean Office Action for Korean Patent Application No. 10-2017-0113482 dated May 24, 2021.
Office Action dated Feb. 14, 2023 in European Patent Application No. 18 853 445.7 (94 pages).

\* cited by examiner

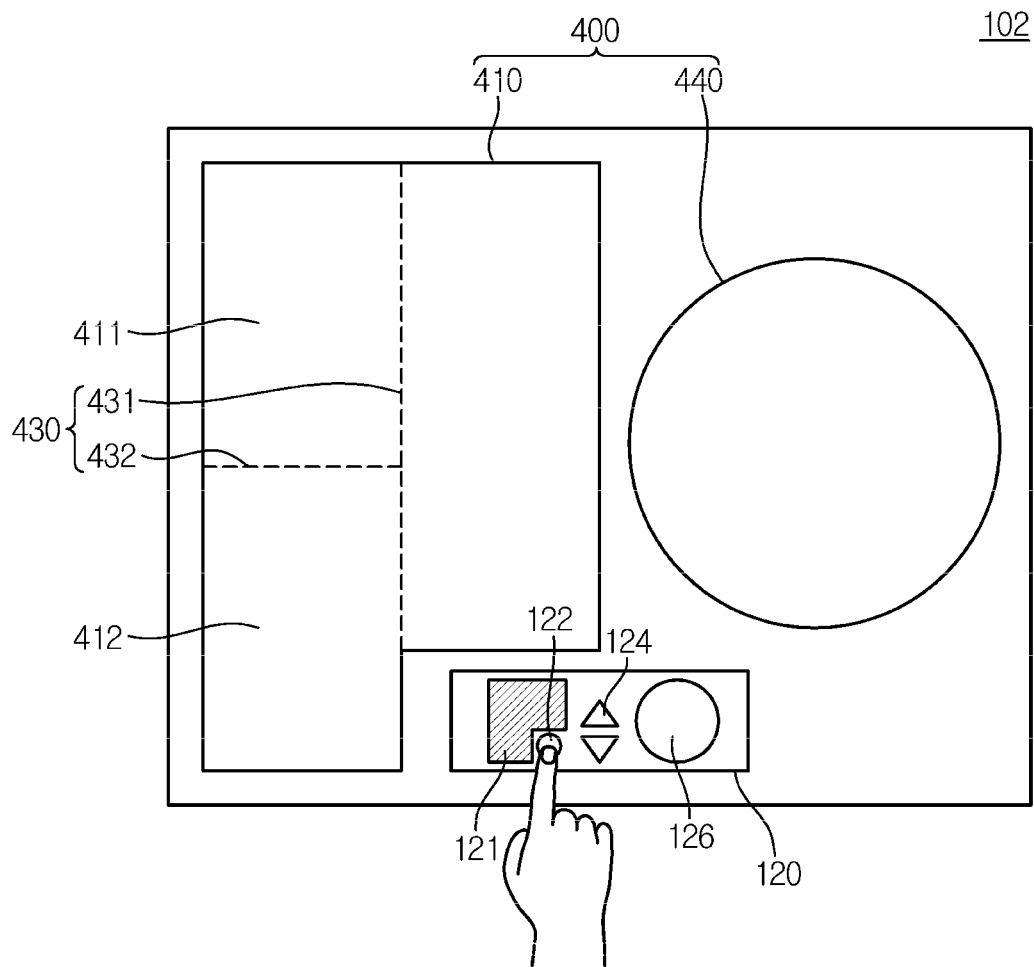

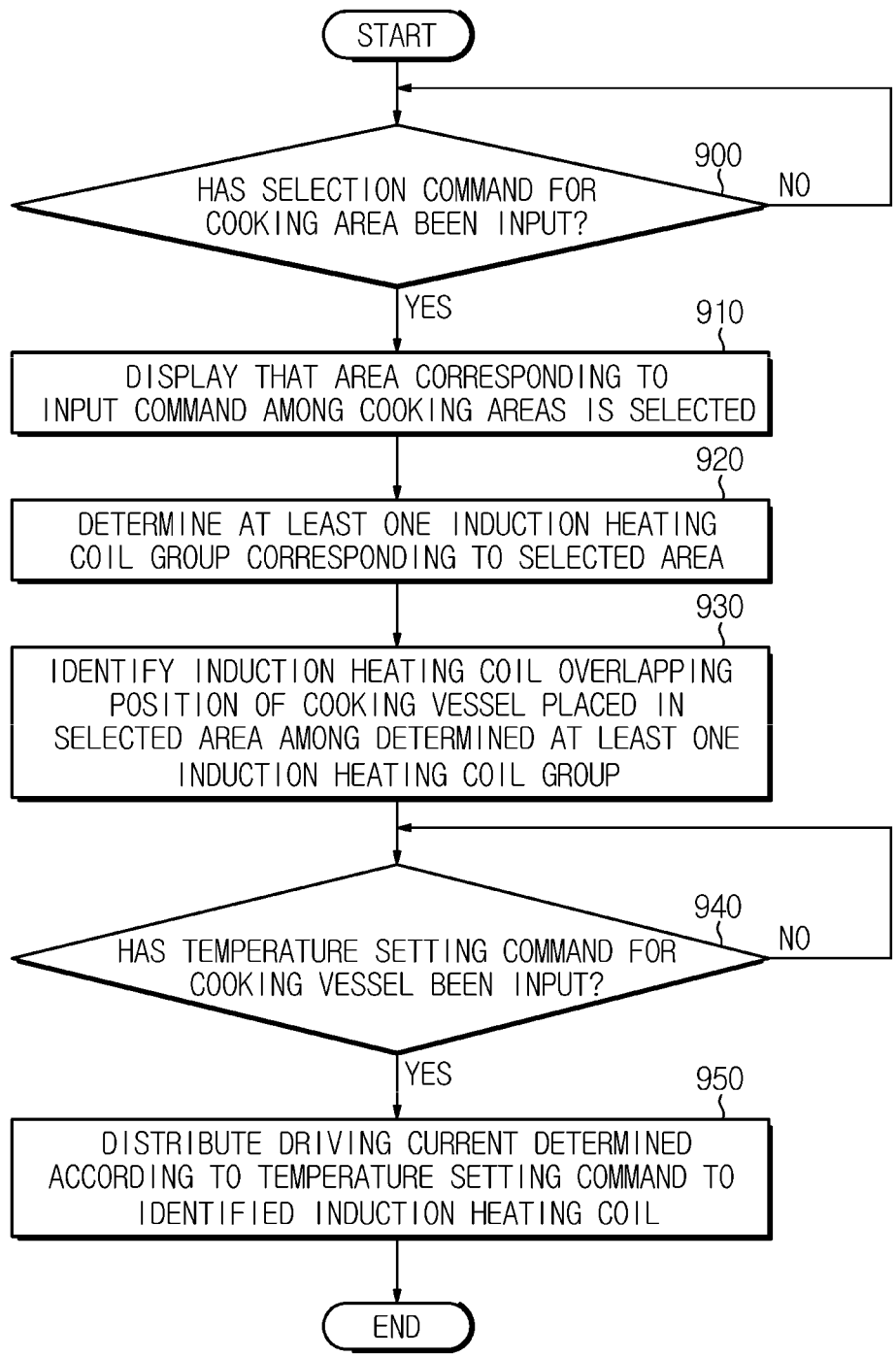

COOKING DEVICE AND CONTROL METHOD THEREFOR

CROSS-REFERENCE TO RELATED APPLICATIONS

This application is a U.S. National Stage Application which claims the benefit under 35 U.S.C. § 371 of International Patent Application No. PCT/KR2018/010293 filed on Sep. 4, 2018, which claims foreign priority benefit under 35 U.S.C. § 119 of Korean Patent Application No. 10-2017-0113482 filed on Sep. 5, 2017, in the Korean Intellectual Property Office, the contents of all of which are incorporated herein by reference.

BACKGROUND

Field

The present disclosure relates to a cooking apparatus having a plurality of induction coils, and a method of controlling the same.

Description of Related Art Generally, an induction heating cooking apparatus is a cooking appliance for heating food using the principle of induction heating. The induction heating cooking apparatus includes a cooking plate on which a cooking vessel is placed, and an induction heating coil to generate a magnetic field when a current is applied thereto.

If the current is applied to the induction heating coil to generate a magnetic field, a secondary current is induced to the cooking vessel, and Joule heat is generated due to resistance components of the cooking vessel. Accordingly, the cooking vessel is heated by the Joule heat so that food contained in the cooking vessel is cooked.

The induction heating cooking apparatus has some advantages in that the cooking vessel can be more rapidly heated than a case with a gas range or a kerosene cooking stove in which a fossil fuel such as gas or oil is burned to heat a cooking vessel using combustion heat and a harmful gas is not generated and there is no risk of fire.

Furthermore, in recent years, the induction heating cooking apparatus has been developed that automatically heats the cooking vessel when the cooking vessel is placed at any position on the induction heating cooking apparatus.

SUMMARY

An aspect of the disclosure provides a cooking apparatus including: a cooking plate including a cooking area divided into a plurality of sub-areas: a plurality of induction heating coil groups installed at a bottom of the cooking plate so as to correspond to each of the plurality of sub-areas: a plurality of drive assemblies configured to supply a driving current to each of the plurality of induction heating coil groups: a user interface configured to receive a compartment command that divides the cooking area of the cooking plate into the plurality of sub-areas: a sub-assembly configured to determine the induction heating coil group corresponding to the sub-area in which a cooking vessel is placed among the plurality of sub-areas when the compartment command is input; and a controller configured to control the drive assembly capable of supplying the driving current to the determined induction heating coil group such that a driving current corresponding to a preset target temperature is distributed to an induction heating coil overlapping the cooking vessel.

The sub-assembly may be separated from the plurality of drive assemblies.

When the compartment command is input, the user interface may be configured to display information about the plurality of sub-areas divided.

The user interface may be configured to display information including a shape of each of the plurality of sub-areas.

The user interface may be configured to display information including a set temperature level of each of the plurality of sub-areas.

The user interface may be configured to receive any one of a plurality of compartment commands that vary the number of the sub-areas to be divided.

When the compartment command is input, the user interface may be configured to receive a selection command for selecting any one of the plurality of sub-areas.

The cooking plate may be printed with a compartment line that divides a cooking area border line and the cooking area into the plurality of sub-areas.

Each of the plurality of induction heating coil groups may be configured to arrange at least six induction heating coils.

The cooking apparatus may further include one circular induction heating coil configured to be driven independently of the plurality of induction heating coil groups. The one circular induction heating coil may have a diameter of 140 mm or more.

Another aspect of the disclosure provides a method of controlling a cooking apparatus, the cooking apparatus includes a plurality of induction heating coil groups installed at a bottom of a cooking plate including a cooking area so as to correspond to each of a plurality of sub-areas of the cooking area and a plurality of drive assemblies configured to supply a driving current to each of the plurality of induction heating coil groups. The method including: receiving, by a user interface, a compartment command for dividing the cooking area into the plurality of sub-areas: when the compartment command is input, determining, by a sub-assembly, the induction heating coil group corresponding to the sub-area in which a cooking vessel is placed among the plurality of sub-areas; and distributing the driving current corresponding to a preset target temperature to an induction heating coil overlapping the cooking vessel by the drive assembly capable of supplying the driving current to the determined induction heating coil group.

The determining of the induction heating coil group corresponding to the sub-area in which the cooking vessel is placed among the plurality of sub-areas may include determining of the induction heating coil group corresponding to the sub-area in which the cooking vessel is placed by the sub-assembly separated from the plurality of drive assemblies.

The method may further include displaying, by the user interface, information about the plurality of sub-areas divided when the compartment command is input.

The displaying of the information may include displaying information including a shape of each of the plurality of sub-areas.

The displaying of the information may include displaying information including a set temperature level of each of the plurality of sub-areas.

The receiving of the compartment command may include receiving any one of a plurality of compartment commands that vary the number of the sub-areas to be divided.

The method may further include receiving, by the user interface, a selection command for selecting any one of the plurality of sub-areas when the compartment command is input.

The cooking plate may be printed with a compartment line that divides a cooking area border line and the cooking area into the plurality of sub-areas.

The determining of the induction heating coil group corresponding to the sub-area in which the cooking vessel is placed may include determining of the induction heating coil group corresponding to the sub-area in which the cooking vessel is placed among the plurality of induction heating coil groups in which at least six induction heating coils are arranged.

BRIEF DESCRIPTION OF THE DRAWINGS

FIGS. 20A to 20C are views for describing the operation of the cooking apparatus of FIG. 19 when a compartment setting command is input.

FIG. 23 is a flowchart illustrating a method of controlling a cooking apparatus according to an embodiment.

DETAILED DESCRIPTION

Figure 1:
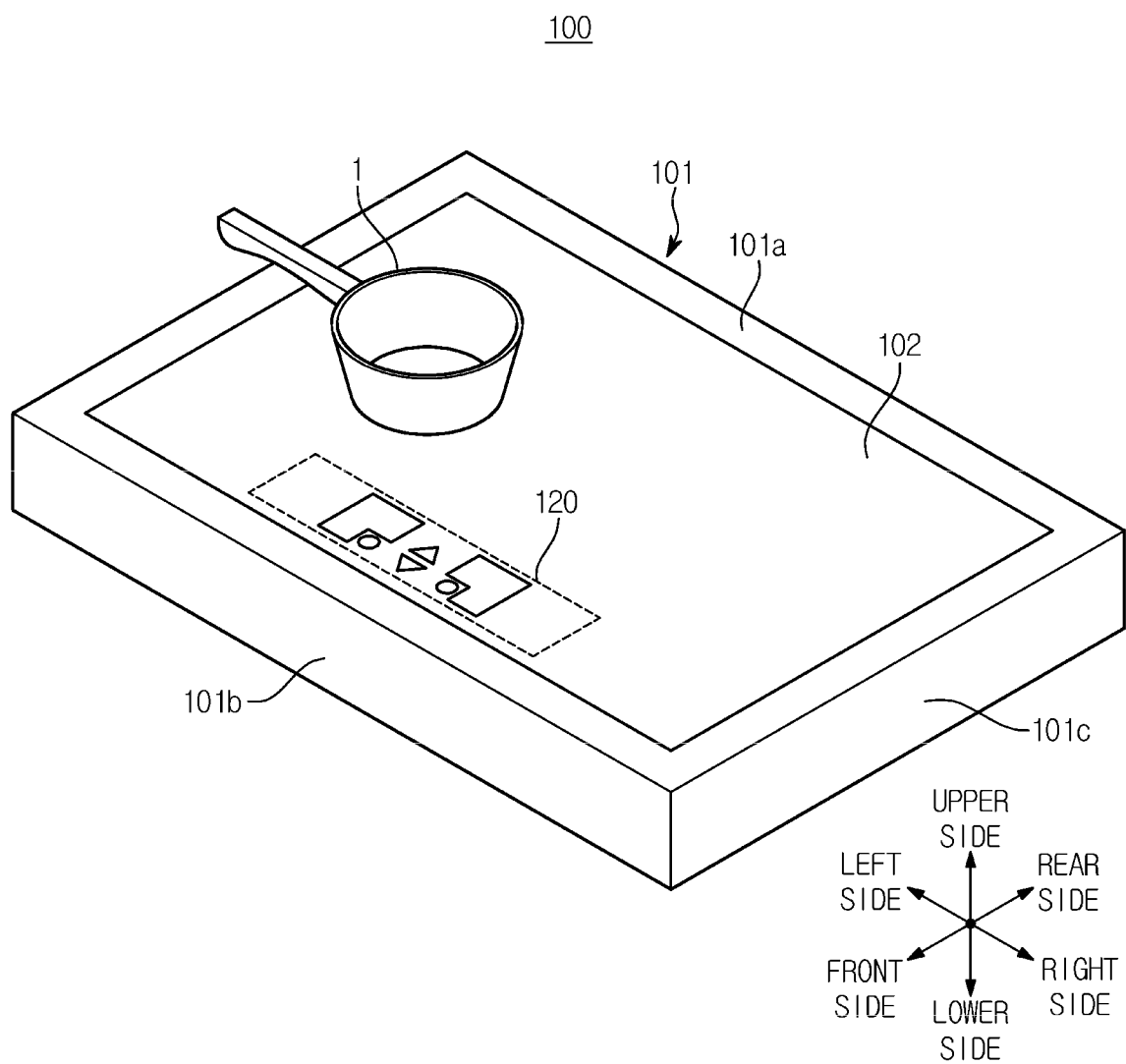
FIG. 1 is an external view of a cooking apparatus according to an embodiment.

Like reference numerals refer to like elements throughout the specification. Not all elements of embodiments of the disclosure will be described, and description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

An aspect of the present disclosure is to provide a cooking apparatus that controls a drive assembly capable of supplying a driving current to an induction heating coil group corresponding to a sub-area where a cooking vessel is placed, so as to supply the driving current corresponding to a preset target temperature to the induction heating coil overlapped the cooking vessel placed in a divided cooking area when a compartment command is input, and a method of controlling the same.

According to an aspect of an embodiment, there is provided a cooking apparatus capable of easily assembling a printed board assembly 300 provided with a driving circuit and a control circuit (not shown).

According to another aspect of an embodiment, there is provided a cooking apparatus in which a plurality of printed board assemblies are disposed such that wires connecting the plurality of printed board assemblies are minimized. Through this, it is possible to reduce the manufacturing cost of the cooking apparatus.

Hereinafter, operation principles and embodiments of the disclosure will be described with reference to the accompanying drawings.

Figure 2:
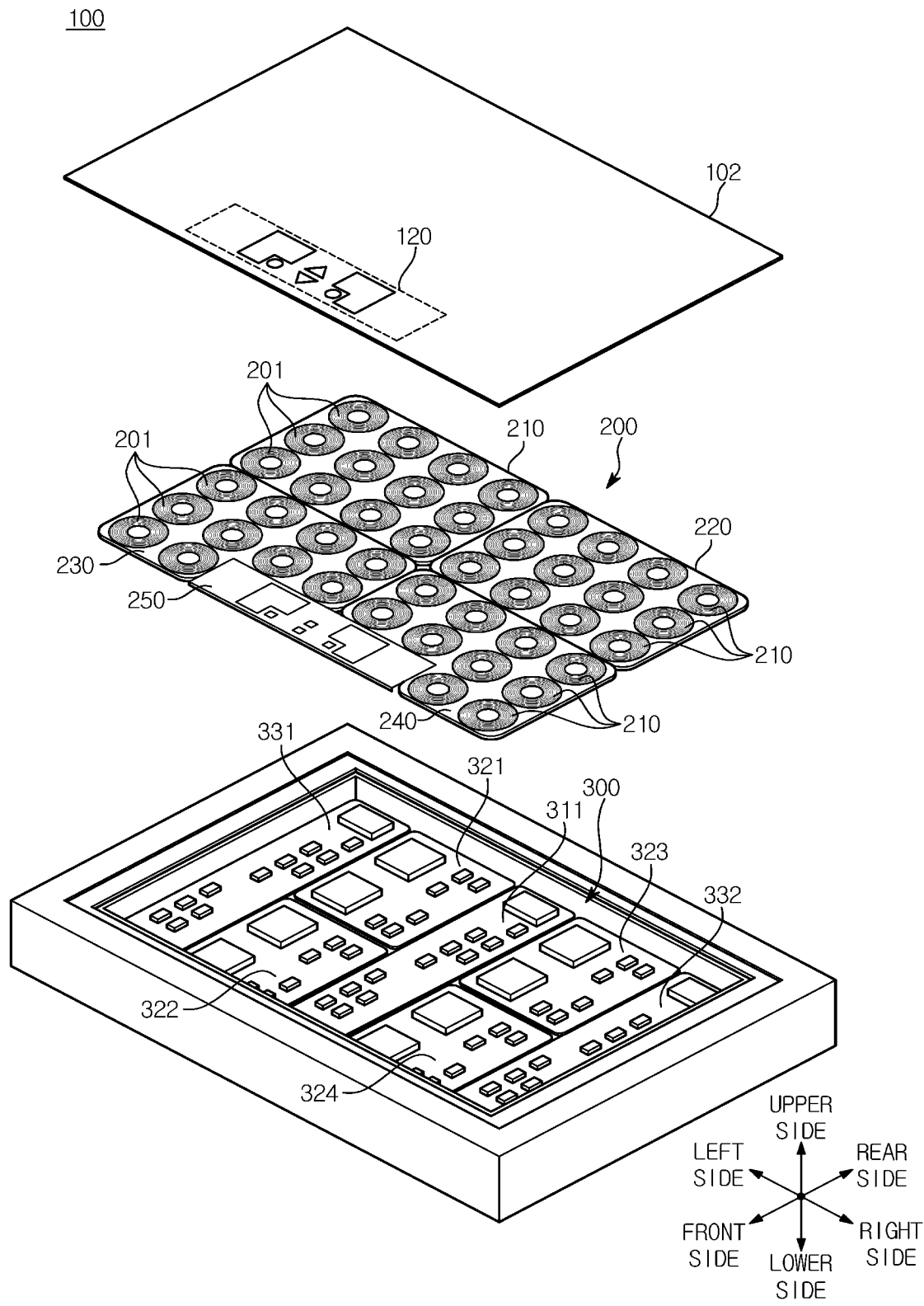
FIG. 2 is a view illustrating an interior of a cooking apparatus according to an embodiment.
Figure 3:
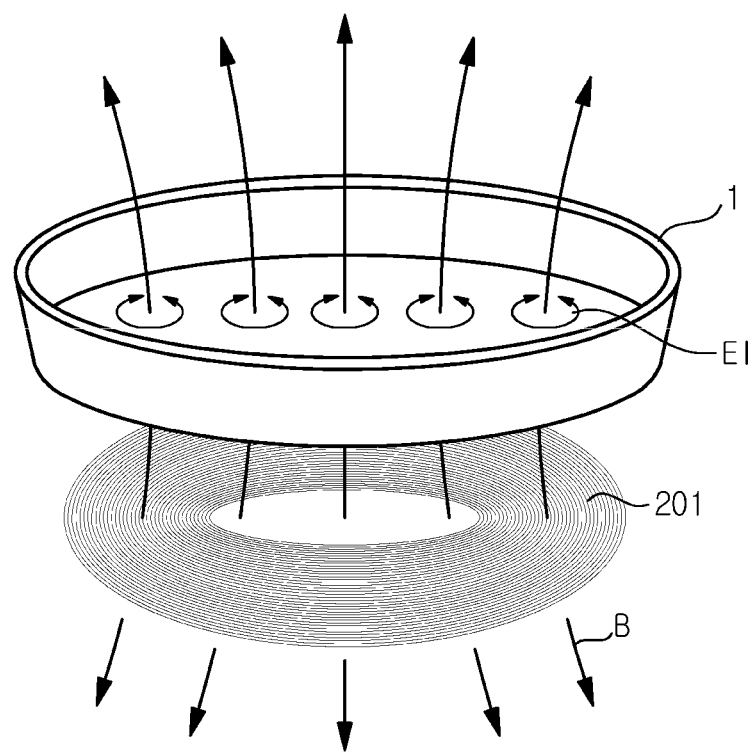
FIG. 3 is a view illustrating a principle of heating a cooking vessel by a cooking apparatus according to an embodiment.

FIG. 1 is an external view of a cooking apparatus according to an embodiment. FIG. 2 is a view illustrating an interior of a cooking apparatus according to an embodiment. FIG. 3 is a view illustrating a principle of heating a cooking vessel by a cooking apparatus according to an embodiment.

Referring to FIGS. 1, 2, and 3, a cooking apparatus 100 may include a main body 101 which forms an exterior of the cooking apparatus 100 and is provided with various components constituting the cooking apparatus 100.

An upper surface of the main body 101 may be provided with a cooking plate 102 having a flat plate shape on which a cooking vessel 1 can be placed. The cooking plate 102 may be made of tempered glass such as ceramic glass so as not to be easily broken.

One side of the cooking plate 102 may be provided with a user interface 120 for receiving a control command from the user and displaying operation information of the cooking apparatus 100 to the user. However, a position of the user interface 120 is not limited to the cooking plate 102 and may be provided at various positions such as a front surface 101b and/or a side surface 101c of the main body 101.

Referring to FIG. 2, a heating layer 200 including a plurality of induction heating coils 201 for heating the cooking vessel 1 and a main assembly 250 for implementing the user interface 120 may be provided under the cooking plate 102.

Each of the plurality of induction heating coils 201 may generate a magnetic field and/or an electromagnetic field for heating the cooking vessel 1.

When a driving current is supplied to the induction heating coil 201, as illustrated in FIG. 3, a magnetic field B may be induced around the induction heating coil 201. In particular, when the induction heating coil 201 is supplied with a current whose magnitude and direction change with time, that is, an alternating current, the magnetic field B whose magnitude and direction change with time may be induced around the induction heating coil 201.

The magnetic field B around the induction heating coil 201 may pass through the cooking plate 102 made of tempered glass and may reach the cooking vessel 1 placed on the cooking plate 102.

Due to the magnetic field B that changes in magnitude and direction with time, an eddy current EI that rotates around the magnetic field B may occur in the cooking vessel 1. As such, a phenomenon in which the eddy current occurs due to the magnetic field B that changes in time is called an electromagnetic induction phenomenon. Due to the eddy current EI, electrical resistance heat may be generated in the cooking vessel 1. The electrical resistance heat is heat generated in a resistor when a current flows through the resistor, and is also called joule heat. The cooking vessel 1 may be heated by the electrical resistance heat, and food contained in the cooking vessel 1 may be heated.

As such, each of the plurality of induction heating coils 201 may heat the cooking vessel 1 using the electromagnetic induction phenomenon and the electrical resistance heat.

The plurality of induction heating coils 201 may be arranged in a predetermined pattern under the cooking plate 102. For example, as illustrated in FIG. 2, the plurality of induction heating coils 201 may be arranged as a matrix by aligning columns and rows. In other words, the plurality of induction heating coils 201 may be arranged at predetermined intervals from the front to the rear of the main body 101, and may be arranged at predetermined intervals from the right side to the left side of the main body 101.

The plurality of induction heating coils 201 may be divided into a plurality of induction heating coil groups 210, 220, 230, and 240. For example, as illustrated in FIG. 2, the plurality of induction heating coils 201 may be divided a first induction heating coil group 210, a second induction heating coil group 220, and a third induction heating coil group 230, and a fourth induction heating coil group 240.

The arrangement of the plurality of induction heating coils 201 is not limited to that illustrated in FIG. 2, and the plurality of induction heating coils 201 may be arranged in various forms. For example, the plurality of induction heating coils 201 may be arranged in a honeycomb shape so that a distance between the induction heating coils 201 is minimized.

A main assembly 250 for implementing the user interface 120 may be provided under the user interface 120 provided on one side of the cooking plate 102. The main assembly 250 may be a printed board assembly (PBA) including a display, the switching element, an integrated circuit element, etc. for implementing the user interface 120, and a printed circuit board (PCB) on which they are installed.

A position of the main assembly 250 is not limited to that illustrated in FIG. 2, and may be disposed at various positions. For example, when the user interface 120 is installed on the front surface 101b of the main body 101, the main assembly 250 may be disposed behind the front surface 101b of the main body 101 separately from the heating layer 200.

Under the heating layer 200, a driving layer (not shown) including a PBA 300 for implementing a circuit for supplying the driving current to the plurality of induction heating coils 201 may be provided.

The PBA 300 may be divided into a plurality of PBAs 311, 321, 322, 323, 324, 331, and 332, as illustrated in FIG. 2. Each of the plurality of PBAs 311, 321, 322, 323, 324, 331, and 332 may include a switching element for supplying the driving current, the integrated circuit element, and the like, and the PCB on which they are installed.

For example, the plurality of PBAs 311, 321, 322, 323, 324, 331, and 332 may include a sub-assembly 311 in which a detecting circuit (not shown) for detecting the presence or absence of the cooking vessel 1 and detecting a temperature of the cooking vessel 1 is installed, drive assemblies 321, 322, 323, and 324 in which the driving circuit for supplying the driving current to the plurality of induction heating coils 201 is installed, and power assemblies 331 and 332 provided with a power supply circuit (not shown) that supply power to the driving circuit.

As described above, as the detecting circuit, the driving circuit, and the power supply circuit are installed in separate PBAs, assembling performance may be improved in a manufacturing process of the cooking apparatus 100. In other words, compared to installing the detecting circuit, the driving circuit, and power supply circuit in one PBA, it is easy to manufacture the PBA by installing the detecting circuit, the driving circuit, and the power supply circuit in the sub-assembly 311, the drive assemblies 321, 322, 323, and 324, and the power assembly 331 and 332, respectively. In addition, it is easier to assemble multiple PBAs of smaller size to the main body 101 than to assemble a large size PBA to the main body 101.

By installing the detecting circuit, the driving circuit, and a power supply circuit in separate PBAs, a maintenance of the cooking apparatus 100 is easy. In other words, even if a defect occurs in any one of the PBAs, the defective PBA may be selectively replaced.

By installing the detecting circuit, the driving circuit, and the power supply circuit in separate PBAs, an interference between circuits may be reduced. For example, because the detecting circuit is spatially separated from the power supply circuit that supplies AC power, a noise from the power supply circuit to the detecting circuit may be significantly reduced.

The number of the induction heating coils 201 provided in the cooking apparatus 100 is large (according to the example illustrated in FIG. 2, forty-four induction heating coils). Therefore, it may not be efficient to supply the driving current to all induction heating coils 201 using one driving circuit.

Accordingly, the cooking apparatus 100 may include the plurality of driving circuits, and the plurality of driving circuits may be installed in the plurality of drive assemblies 321, 322, 323, and 324. For example, four driving circuits may be installed in four drive assemblies 321, 322, 323, and 324, respectively.

The number of induction heating coils 201 (according to the example illustrated in FIG. 2, forty-four induction heating coils) is greater than the number of drive assemblies 321, 322, 323, and 324 (according to the example illustrated in FIG. 2, four drive assemblies). In order for four drive assemblies 321, 322, 323, and 324 to supply the driving current to forty-four induction heating coils 201, the forty-four induction heating coils 201 may be divided into four induction heating coil groups 210, 220, 230, and 240.

The four drive assemblies 321, 322, 323, and 324 may supply the driving current to the induction heating coils 201 belonging to the four induction heating coil groups 210, 220, 230, and 240, respectively. For example, a first drive assembly 321 may supply the driving current to the induction heating coil 201 belonging to a first induction heating coil group 210, and a second drive assembly 322 may supply the driving current to the induction heating coil 201 belonging to a second induction heating coil group 220. In addition, a third drive assembly 323 may supply the driving current to the induction heating coil 201 belonging to a third induction heating coil group 230, and a fourth drive assembly 324 may supply the driving current to the induction heating coil 201 belonging to a fourth induction heating coil group 240.

The number of the drive assemblies and the number of the groups are not limited to those illustrated in FIG. 2. The number of the drive assemblies and the number of the groups are the number of the induction heating coils, a size of the cooking apparatus 100, a size of the elements constituting the driving circuit, a magnitude of the driving current supplied to each of the induction heating coils, and a magnitude of the current that each of the drive assemblies can output. For example, when the size of the cooking apparatus 100 is reduced and the number of induction heating coils is reduced, the driving circuit may be installed in each of the two drive assemblies. In addition, when the size of the cooking apparatus 100 becomes larger and the number of the induction heating coils increases, the driving circuits may be installed in 6 or 8 drive assemblies, respectively.

However, in order to increase a degree of freedom in a position where the cooking vessel 1 is placed, it is preferable that the number of the induction heating coils belonging to one induction heating coil group is at least six, and a diameter of each of the induction heating coils is 90 mm or less.

The four drive assemblies 321, 322, 323, and 324 may be disposed two on each side of the sub-assembly 311. For example, the first drive assembly 321 and the second drive assembly 322 are disposed on a left side of the sub-assembly 311, and the third drive assembly 323 and the fourth drive assembly 324 are disposed on a right side of the sub-assembly 311.

Since the four drive assemblies 321, 322, 323, and 324 are disposed on both sides of the sub-assembly 311, the power supply circuits may be installed in the two power assemblies 331 and 332. In other words, the two power assemblies 331 and 332 may be provided on both sides of drive assemblies 321, 322, 323 and 324 to supply the AC power to the drive assemblies 321, 322, 323 and 324 disposed on both sides of the sub-assembly 311, respectively. For example, a first power assembly 331 may be provided on the side surfaces of the first and second drive assemblies 321 and 333, and a second power assembly 332 may be provided on the side surfaces of the third and fourth drive assemblies 323 and 324.

As described above, the cooking apparatus 100 may include the plurality of induction heating coils 201 for heating the cooking vessel 1 and the detecting circuit, the driving circuit, and the power supply circuit for supplying the driving currents to the induction heating coils 201. In addition, the detecting circuit, the driving circuit and the power supply circuit may be installed in the plurality of PBAs 311, 321, 322, 323, 324, 331, and 332 separated from each other. As such, the detecting circuit, the driving circuit, and the power supply circuit are installed in the plurality of PBAs 311, 321, 322, 323, 324, 331, and 332, the manufacturing and assembly of the PBAs 311, 321, 322, 323, 324, 331, and 332 may be facilitated, and productivity of the cooking apparatus 100 may be improved.

The structure and function of the cooking apparatus 100 have been briefly described above. Hereinafter, the configuration of the cooking apparatus 100 and the functions of each configuration will be described in detail.

Figure 4:
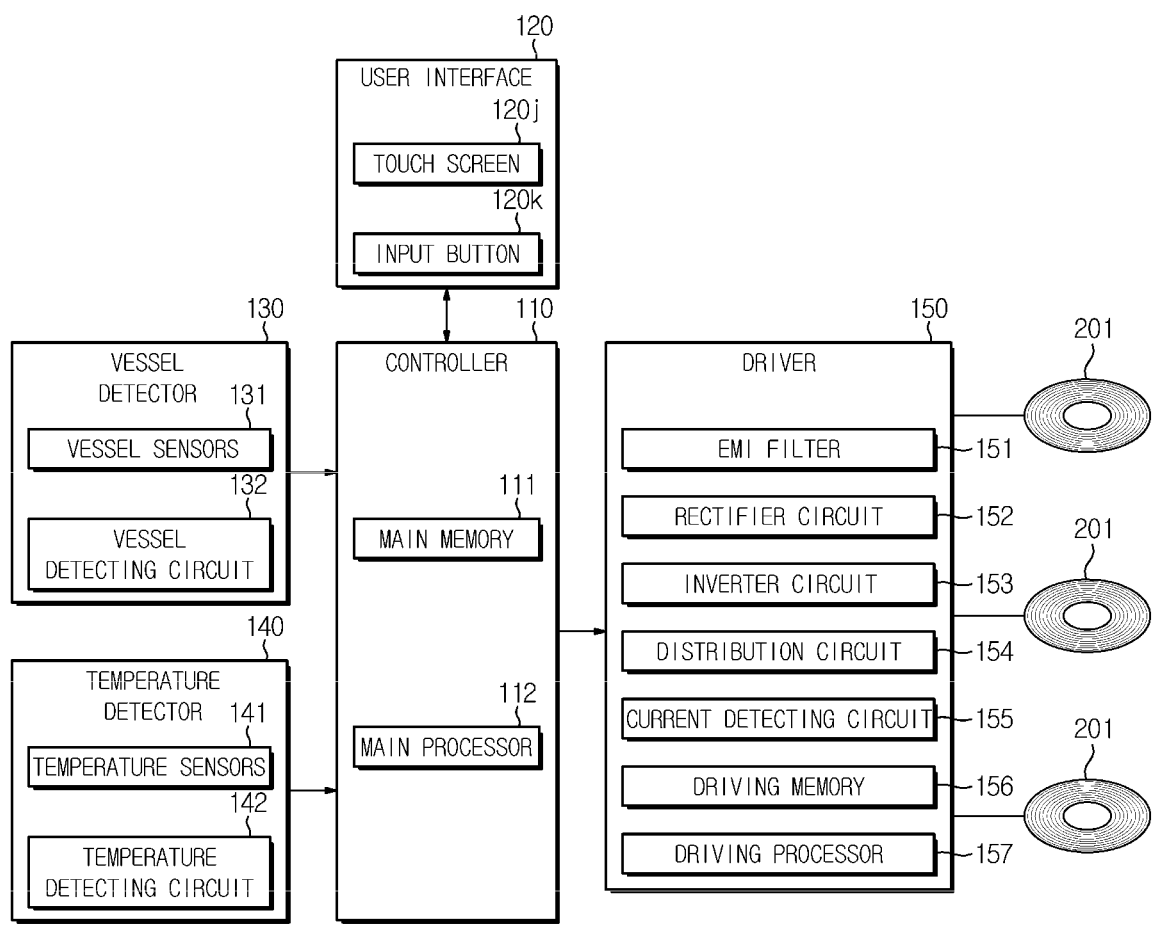
FIG. 4 is a control block diagram of a cooking apparatus according to an embodiment.
Figure 5:
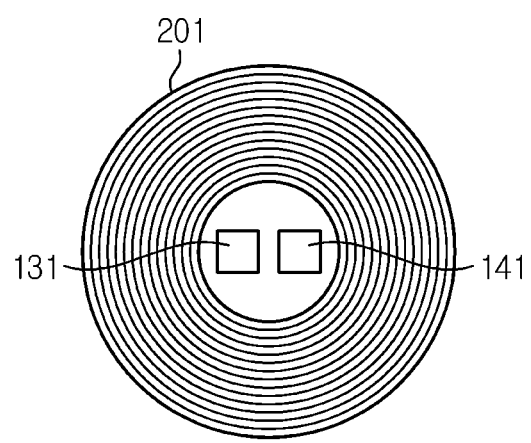
FIG. 5 is a view illustrating an induction heating coil, a vessel sensor, and a temperature sensor included in a cooking apparatus according to an embodiment.
Figure 6:
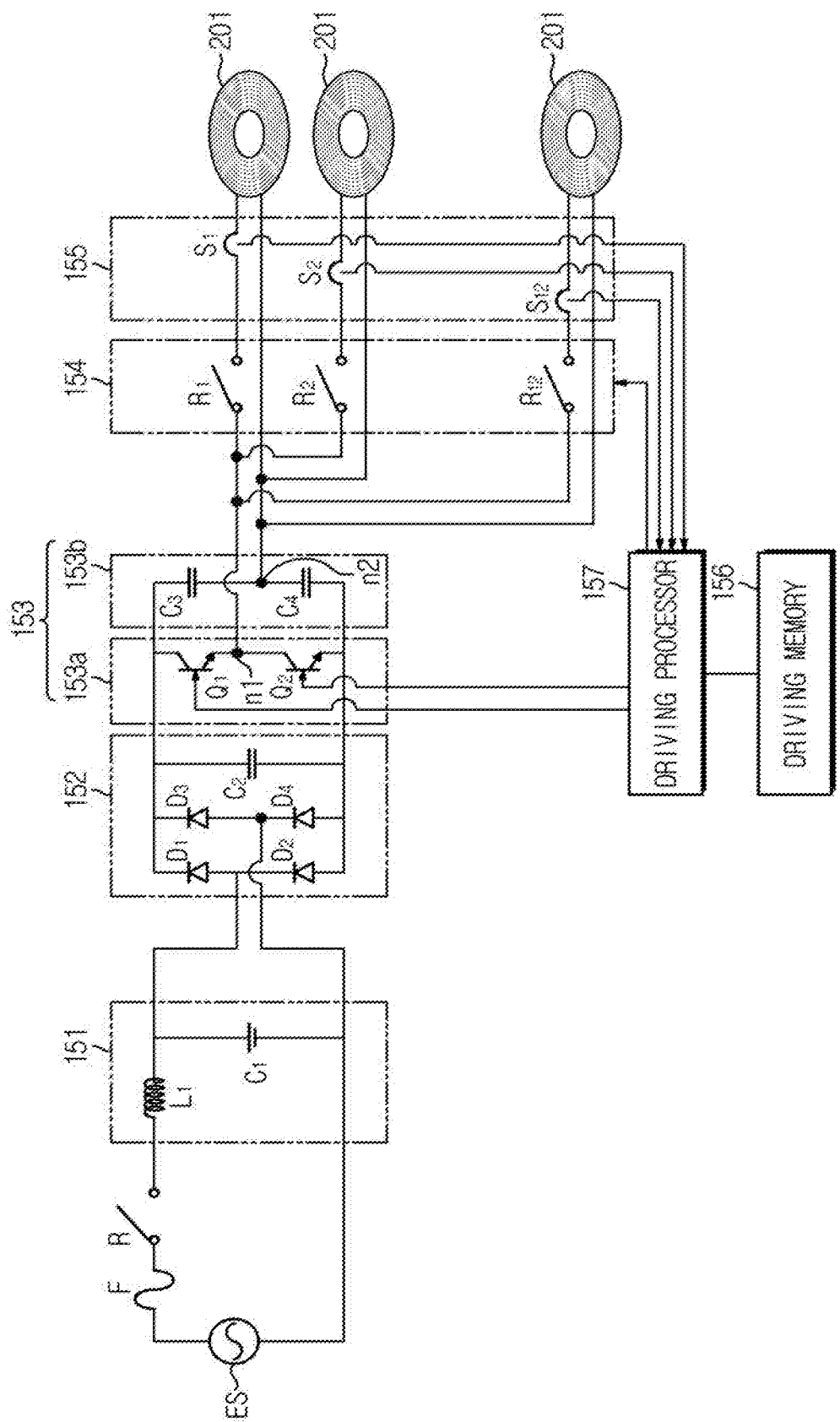
FIG. 6 is a view illustrating a circuit of a driver included in a cooking apparatus according to an embodiment.

FIG. 4 is a control block diagram of a cooking apparatus according to an embodiment, FIG. 5 is a view illustrating an induction heating coil, a vessel sensor, and a temperature sensor included in a cooking apparatus according to an embodiment, and FIG. 6 is a view illustrating a circuit of a driver included in a cooking apparatus according to an embodiment.

Referring to FIGS. 4, 5, and 6, the cooking apparatus 100 may include the plurality of induction heating coils 201, the user interface 120, a vessel detector 130, a temperature detector 140, a driver 150, and a controller 110.

The plurality of induction heating coils 201 may generate the magnetic field and/or the electromagnetic field for heating the cooking vessel 1 as described above.

The user interface 120 includes a touch screen 120j that receives a touch input from a user and displays an image related to an operation of the cooking apparatus 100 in response to the user's touch input, and an input button 120k that receives a control command from the user.

The touch screen 120j includes a touch panel that receives the touch input from the user, a display panel that displays the image of the operation of the cooking apparatus 100, and a touch screen controller that controls the operation of the touch panel and the display panel.

The touch screen 120j may display the image related to the operation of the cooking apparatus 100 and output the user's touch input according to the displayed image to the controller 110. Also, the touch screen 120j may receive information about the operation of the cooking apparatus 100 from the controller 110 and display the image corresponding to the received information.

The input button 120k may include a plurality of buttons for receiving a predetermined control command from the user and outputting an electrical signal corresponding to the user's control command to the controller 110. For example, the input button 120k may include an operation button for receiving a power on/off command of the cooking apparatus 100, a power up button and a power down button for receiving a strength of the magnetic field and/or the electromagnetic field output by the cooking apparatus 100, and a power.

The input button 120k may be implemented as various types of buttons (or switches) such as push buttons, slide buttons, toggle buttons, touch buttons, and dials.

As such, the user interface 120 may receive the control command from the user and output the electrical signal corresponding to the user's control command to the controller 110. In addition, the user interface 120 may receive the information about the operation of the cooking apparatus 100 from the controller 110 and display the image corresponding to the information about the operation of the cooking apparatus 100.

For example, the user interface 120 may display an image indicating a position of the cooking vessel 1 detected by the vessel detector 130 on the touch screen 120j. In addition, the user interface 120 may receive the user's touch input for selecting the cooking vessel 1 through the touch screen 120j, and may output the user's touch input to the controller 110. When the user inputs an output up command of the cooking apparatus 100 through the input button 120k, the user interface 120 may output the output up command to the controller 110.

The vessel detector 130 may detect the position of the cooking vessel 1 placed on the cooking plate 102. The cooking vessel 1 may be located anywhere on the cooking plate 102. Therefore, for efficient operation, the cooking apparatus 100 may detect the position of the cooking vessel 1 on the cooking plate 102 and selectively operate the induction heating coil 201 corresponding to the position of the cooking vessel 1.

The vessel detector 130 may include a plurality of vessel sensors 131 for detecting the position of the cooking vessel 1 and a vessel detecting circuit 132 for processing outputs of the vessel sensors 131 and outputting information about the position of the cooking vessel 1 to the controller 110.

Each of the plurality of vessel sensors 131 may be installed near the plurality of induction heating coils 201, and may detect the cooking vessel 1 located on the adjacent induction heating coils 201. For example, as illustrated in FIG. 5, the vessel sensor 131 may be located at a center of the induction heating coil 210 and may detect the cooking vessel 1 located to overlap with the center of the induction heating coil 201. However, the position of the vessel sensor 131 is not limited to that illustrated in FIG. 5, and may be installed anywhere near the induction heating coil 201.

The vessel sensor 131 may include a capacitive sensor for detecting the cooking vessel 1. Particularly, the vessel sensor 131 may detect a change in capacitance caused by the cooking vessel 1. However, the vessel sensor 131 is not limited to the capacitive sensor, and includes various sensors capable of detecting the cooking vessel 1 placed on the cooking plate 102 such as an infrared sensor, a weight sensor, a micro switch, and a membrane switch.

The vessel sensor 131 may output information regarding the detection of the cooking vessel 1 to the vessel detecting circuit 132.

The vessel detecting circuit 132 may receive the detection results of the cooking vessel 1 from the plurality of vessel sensors 131, and may determine a position where the cooking vessel 1 is placed, particularly, the induction heating coil 201 overlapping the cooking vessel 1, based on the detection results.

The vessel detecting circuit 132 may include a multiplexer for sequentially receiving the detection results from the plurality of vessel sensors 131 (according to the example illustrated in FIG. 2, forty-four vessel sensors), and a microprocessor for processing the detection results of the plurality of vessel sensors 131.

The vessel detecting circuit 132 may output vessel position data in which the detection results of the plurality of vessel sensors 131 are processed to the controller 110.

As such, the vessel detector 130 may determine the induction heating coil 201 overlapping the cooking vessel 1, and may output the detection results to the controller 110. The controller 110 may display the position of the cooking vessel 1 on the user interface 120 based on the detection results of the vessel detector 130.

The temperature detector 140 may detect the temperature of the cooking vessel 1 placed on the cooking plate 102. The cooking vessel 1 may be heated by the induction heating coil 201 and may be overheated depending on the material. Therefore, for safe operation, the induction heating apparatus 100 may detect the temperature of the cooking vessel 1 placed on the cooking plate 102 and block the operation of the induction heating coil 201 when the cooking vessel 1 is overheated.

The temperature detector 140 may include a plurality of temperature sensors 141 for detecting the temperature of the cooking vessel 1 and a temperature detecting circuit 142 for processing the output of the temperature sensors 141 and outputting information about the temperature of the cooking vessel 1 to the controller 110.

Each of the plurality of first temperature sensors 141 may be installed near the plurality of induction heating coils 201 and measure the temperature of the cooking vessel 1 heated by the first induction heating coil 201. For example, as illustrated in FIG. 5, the temperature sensors 141 may be located at the center of the first induction heating coil 201. The temperature sensors 141 may directly measure the temperature of the cooking vessel 1 or measure the temperature of the cooking plate 102 capable of estimating the temperature of the cooking vessel 1. However, the position of the first temperature sensor 141 is not limited to that illustrated in FIG. 5, and may be installed anywhere near the induction heating coil 201.

The temperature sensors 141 may include a thermistor whose electrical resistance changes with the temperature.

The temperature sensors 141 may output a signal indicating the temperature of the cooking vessel 1 to the first temperature detecting circuit 142.

The temperature detecting circuit 142 may receive the signal indicating the temperature of the cooking vessel 1 from the plurality of temperature sensors 141, and determine the temperature of the cooking vessel 1 from the received signal.

The temperature detecting circuit 142 may include a multiplexer for sequentially receiving signals indicating the temperature from the plurality of temperature sensors 141 (according to the example illustrated in FIG. 2, forty-four temperature sensors) and an analog-digital converter (ADC) for converting the signal indicating the temperature into digital temperature data.

The temperature detecting circuit 142 may process the signal indicating the temperature of the cooking vessel 1 output by the plurality of temperature sensors 141, and may output temperature data to the controller 110.

As such, the temperature detector 140 may detect the temperature of the cooking vessel 1 and output the detection results to the controller 110. The controller 110 may determine whether the cooking vessel 1 is overheated based on the detection results of the temperature detector 140, and may stop the heating of the cooking vessel 1 when the cooking vessel 1 is overheated.

The driver 150 may receive power from an external power source and supply the current to the induction heating coil 201 according to a driving control signal of the controller 110. As described above, the driving circuit may be installed in each of the plurality of drive assemblies 321, 322, 323, and 324. For ease of understanding, the driving circuit installed in any one of the plurality of drive assemblies 321, 322, 323, and 324 will be described below.

The driver 150 may include an Electro Magnetic Interference (EMI) filter 151, a rectifier circuit 152, an inverter circuit 153, a distribution circuit 154, a current detecting circuit 155, a driving memory 156, and a driving processor 157.

The EMI filter 151 may block high frequency noise (e.g., harmonics of AC power) included in the AC power supplied from the external power supply ES, and may pass an alternating voltage and an alternating current of a predetermined frequency (e.g., 50 Hz or 60 Hz).

The EMI filter 151 may include an inductor L1 provided between an input and an output of the filter and a capacitor C1 provided between a positive output and a negative output of the filter. The inductor L1 may block the passage of high frequency noise, and the capacitor C1 may bypass the high frequency noise to the external power source ES.

In addition, a fuse F and a relay R for blocking an overcurrent may be provided between the EMI filter 151 and the external power supply ES.

The AC power in which the high frequency noise is blocked by the EMI filter 151 may be supplied to the rectifier circuit 152.

The rectifier circuit 152 may convert AC power into DC power. Particularly, the rectifier circuit 152 may convert an AC voltage whose magnitude and polarity (positive voltage or negative voltage) changes with time into a DC voltage having a constant magnitude and polarity, and may convert an AC current whose magnitude and direction (positive current or negative current) changes with time into a constant DC current.

The rectifier circuit 152 may include a bridge diode. For example, the rectifier circuit 152 may include four diodes D1, D2, D3, and D4. The diodes D1, D2, D3, and D4 form two diode pairs D1 and D2, D3 and D4 in series, and the two diode pairs D1 and D2, D3 and D4 may be connected in parallel with each other. The bridge diode may convert the AC voltage whose polarity changes with time into a positive voltage with a constant polarity, and may convert the AC current whose direction changes with time into a positive current with a constant direction.

In addition, the rectifier circuit 152 may include a DC link capacitor C2. The DC link capacitor C2 may convert the positive voltage whose magnitude changes with time into the DC voltage having a constant magnitude.

As described above, the rectifier circuit 152 may input the AC voltage and the AC current from the EMI filter 151, and may output the DC voltage and the DC current.

The inverter circuit 153 may include a switching circuit 153a that supplies or blocks the driving current to the induction heating coil 201, and a resonant circuit 153b that causes resonance with the induction heating coil 201.

The switching circuit 153a may include a first switch Q1 and a second switch Q2. The first switch Q1 and the second switch Q2 may be connected in series between a plus line P (n1) and a minus line N (n2).

The first switch Q1 and the second switch Q2 may be turned on or off according to the driving control signal of the driving processor 157. In addition, according to the turning on/off of the first switch Q1 and the second switch Q2, the current may output through the first switch Q1 and/or the second switch Q2 to the induction heating coil 201, or the current may be input from the induction heating coil 201 through the first switch Q1 and/or the second switch Q2.

Figure 7:
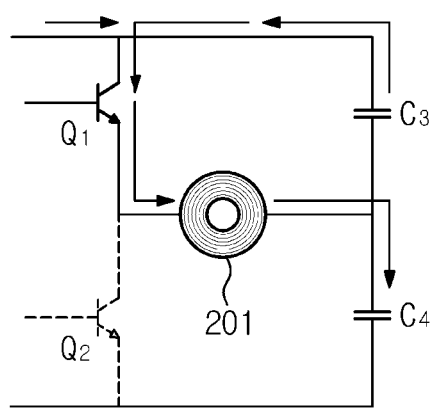
FIGS. 7 and 8 are views illustrating operations of a driver and an induction heating coil included in a cooking apparatus according to an embodiment.
Figure 8:
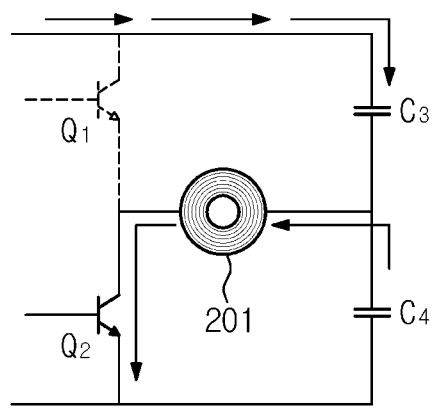

For example, as illustrated in FIG. 7, when the first switch Q1 is closed (turned on) and the second switch Q2 is opened (turned off), the current may be supplied through the first switch Q1 to the induction heating coil 201. In addition, as illustrated in FIG. 8, when the first switch Q1 is opened (turned off) and the second switch Q2 is closed (turned on), the current may be supplied from the induction heating coil 201 through the switching element 201.

Since the first switch Q1 and the second switch Q2 is turned on/off at a high speed of 20 KHz to 70 kHz, the first switch Q1 and the second switch Q2 may include a three-terminal semiconductor element switch having a fast response speed. For example, the first switch Q1 and the second switch Q2 may be a bipolar junction transistor (BJT), a metal-oxide-semiconductor field effect transistor (MOST), an insulated gate bipolar transistor (IGBT), a thyristor, and the like.

The resonant circuit 153b may include a first resonant capacitor C3 and a second resonant capacitor C4. The first resonant capacitor C3 and the second resonant capacitor C4 may be connected in series between the plus line P and the minus line N.

The current may be output from the first resonant capacitor C3 and/or the second resonant capacitor C4 to the induction heating coil 201, or may be input from the induction heating coil 201 to the first resonant capacitor C3 and/or the second resonant capacitor C4.

For example, as illustrated in FIG. 7, when the first switch Q1 is closed (turned on) and the second switch Q2 is opened (turned off), the current may be supplied from the induction heating coil 201 to the first resonant capacitor C3 and/or the second resonant capacitor C4. In addition, as illustrated in FIG. 8, when the first switch Q1 is opened (turned off) and the second switch Q2 is closed (turned on), the current may be supplied from the first resonant capacitor C3 and/or the second resonant capacitor C4 to the induction heating coil 201.

As such, the inverter circuit 153 may control the current supplied to the induction heating coil 201. Particularly, according to the turning on/off of the first switch Q1 and the second switch Q2 included in the inverter circuit 153, the positive current or the negative current may be supplied to the induction heating coil 201.

For example, as illustrated in FIG. 7, when the first switch Q1 is closed (turned on) and the second switch Q2 is opened (turned off), the current supplied from the rectifier circuit 152 may be supplied through the first switch Q1 to the induction heating coil 201. The current supplied to the induction heating coil 201 may be supplied to the second resonant capacitor C4 through the induction heating coil 201, and an electrical energy may be stored in the second resonant capacitor C4. At this time, the positive current may flow through the induction heating coil 201. Further, as the electrical energy is stored in the second resonant capacitor C4, the current may be supplied from the first resonant capacitor C3 to the induction heating coil 201 through the first switch Q1.

Also, as illustrated in FIG. 8, when the first switch Q1 is opened (turned off) and the second switch Q2 is closed (turned on), the current may flow from the second resonant capacitor C4 to the induction heating coil 201. The current supplied to the induction heating coil 201 may flow to the rectifier circuit 152 through the induction heating coil 201 and the second switch Q2. At this time, the negative current may flow through the induction heating coil 201. In addition, as the current is output from the second resonant capacitor C4, the electrical energy stored in the second resonant capacitor may decrease. As the electrical energy of the second resonant capacitor C4 decreases, the current may be supplied from the rectifier circuit 152 to the first resonant capacitor C3.

The distribution circuit 154 may include a plurality of switches R1, R2, . . . . R12 for passing or blocking the current supplied to the plurality of induction heating coil 201. The plurality of switches R1, R2, . . . . R12 may be turned on or off according to a distribution control signal of the driving processor 157.

As illustrated in FIG. 6, the induction heating coil 201 may be connected in parallel with each other between a first node n1 to which the first switch Q1 and the second switch Q2 are connected. The plurality of switches R1, R2, . . . . R12 of the distribution circuit 154 may be connected in series with the plurality of induction heating coils 201, and may pass or block the current supplied from the inverter circuit 153 to the induction heating coils 201.

The driver 150 of the cooking apparatus 100 may supply the driving current to the plurality of induction heating coils 201 included in the induction heating coil groups 210, 220, 230, and 240. For example, as illustrated in FIG. 2, the driver 150 may supply the driving current to eleven or twelve induction heating coils 201. In addition, the cooking apparatus 100 may detect the position where the cooking vessel 1 is placed, that is, the induction heating coil 201 overlapping with the cooking vessel 1. Therefore, for efficient operation, the cooking apparatus 100 may selectively supply the driving current to the induction heating coil 201 overlapping the cooking vessel 1.

Particularly, when the cooking vessel 1 placed on the cooking plate 102 is detected, the cooking apparatus 100 may close (turns on) the switches R1, R2, . . . . R12 connected to the induction heating coil 201 overlapping the cooking vessel 1, open (turns off) the switches R1, R2, . . . . R12 connected to the induction heating coil 201 that does not overlap the cooking vessel 1, and control the inverter circuit 153 to supply the driving current to the plurality of induction heating coils 201.

In addition, when the driver 150 drives the eleven or twelve induction heating coils 201, as the example illustrated in FIG. 2, eleven or twelve switches R1, R2, . . . . R12 for controlling the current supplied to each of the eleven or twelve induction heating coils 201 may be provided.

Each of the plurality of switches R1, R2, . . . . R12 included in the distribution circuit 154 may include a relay.

As such, the distribution circuit 154 may block the driving current to the induction heating coil 201 that does not overlap the cooking vessel 1 and selectively pass the driving current to the induction heating coil 201 overlapping the cooking vessel 1.

The current detecting circuit 155 may include current sensors S1, S2, . . . . S12 that measure the current supplied to each of the induction heating coils 201. The current sensors S1, S2, . . . . S12 may output an electrical signal corresponding to the measured current value to the driving processor 157.

In order to control an amount of heat generated by the cooking vessel 1, the user may control the output of the cooking apparatus 100 through the user interface 120. At this time, the amount of heat generated by the cooking vessel 1 may be controlled according to the intensity of the magnetic field B output from the induction heating coil 201, and the intensity of the magnetic field B output by the induction heating coil 201 may be controlled according to the amount of the current to the induction heating coil 201. Therefore, the cooking apparatus 201 may control the magnitude of the current supplied to the induction heating coil 201 in order to control the amount of heat generated by the cooking vessel 1, and may measure a current value supplied to the induction heating coil 201 in order to control the magnitude of the current supplied to the induction heating coil 201.

The current sensors S1, S2, . . . . S12 may measure the current value of the induction heating coil 201 for controlling the magnitude of the current supplied to the induction heating coil 201.

The current sensors S1, S2, . . . . S12 may include various circuits. For example, the current sensor S1, S2, . . . . S12 may include a hall sensor for measuring the intensity of the magnetic field generated around a wire supplying the current to the induction heating coil 201, and may calculate the current value supplied to the induction heating coil 201 based on the intensity of the magnetic field measured by the hall sensor.

As such, the current detecting circuit 155 may measure the magnitude of the current supplied to each of the plurality of induction heating coils 201.

The driving memory 156 may store driving programs and driving data for controlling the operation of the driver 150. In addition, the driving memory 156 may temporarily store control commands received from the controller 110 and current values measured by the current detecting circuit 155.

Also, the driving memory 156 may provide the driving programs and/or the driving data to the driving processor 157 according to a memory control signal of the driving processor 157, or may provide control commands received from the controller 110 and/or the current value measured by the current detecting circuit 155 to the driving processor 157.

The driving memory 156 may include volatile memories such as static random access memory (S-RAM) and dynamic random access memory (D-RAM) for temporarily storing data. The driving memory 156 may include non-volatile memories, for example, read only memory (ROM), erasable programmable read only memory (EPROM), electrically erasable programmable read only memory (EE-PROM), and flash memory for storing driving programs and driving data for a long period of time.

The driving processor 157 may include various logic circuits and arithmetic circuits, and may process data according to the program provided from the driving memory 156 and generate a control signal according to the processing result.

For example, the driving processor 157 may calculate a switching frequency (turning on/off frequency) of the switching circuit 153a of the inverter circuit 153 from an output control signal indicating an output intensity of the cooking apparatus 100 and the current value received from the current detecting circuit 155, and may generate the driving control signal for turning on/off the switching circuit 153a may be generated according to the calculated switching frequency. In addition, the driving processor 157 may generate the distribution control signal for turning on/off the plurality of switches R1, R2, . . . . R12 of the distribution circuit 154 according to the position of the cooking vessel 1 received from the controller 110.

The driving memory 156 and the driving processor 157 may be implemented as a separate integrated circuit (IC), or may be integrally implemented as a single integrated circuit.

As such, the driver 150 may selectively supply the driving current to the plurality of induction heating coils 201 according to the output intensity output by the controller 110.

The controller 110 may collectively control the operation of the cooking apparatus 100 according to a user input received through the user interface 120, and may include a main memory 111 and a main processor 112.

The main memory 111 may temporarily store control programs and control data for controlling the operation of the cooking apparatus 1. In addition, the main memory 111 may include the user input received from the user interface 120, position data of the cooking vessel 1 received from the vessel detector 130, and the temperature data of cooking vessel 1 received from the temperature detector 140.

Also, the main memory 111 may provide the control programs and/or control data to the main processor 112 according to the memory control signal from the main processor 112, or may provide the user input, the position data of the cooking vessel 1 and/or the temperature data of the cooking vessel 1 and the like to the main processor 112.

The main memory 111 may include volatile memories such as S-RAM and D-RAM for temporarily storing data. The main memory 111 may include non-volatile memories, for example, ROM, EPROM, EEPROM, and flash memory for storing the control programs and control data for the long period of time.

The main processor 112 may include various logic circuits and arithmetic circuits, and may process data according to the program provided from the main memory 111 and generate the control signal according to the processing result.

For example, the main processor 111 may generate the output control signal for controlling the intensity of the magnetic field B of the induction heating coil 201 according to the output intensity received from the user interface 120. In addition, the main processor 111 may generate a signal for preventing overheating for blocking the AC power supplied to the driver 150 according to the temperature of the cooking vessel 1. In addition, in some cases, the main processor 111 may generate the distribution control signal for turning on/off the plurality of switches R1, R2, . . . . R12 of the distribution circuit 154 according to the position of the cooking vessel 1.

The main memory 111 and the main processor 112 may be implemented as the separate integrated circuit (IC), or may be integrally implemented as the single integrated circuit.

As such, the controller 110 may control the driver 150 such that the driver 150 selectively supplies the driving currents to the plurality of induction heating coils 201 according to the user input inputted through the user interface 120.

In the above, the components included in the cooking apparatus 100 and the functions of each of the components have been described. Hereinafter, the arrangement of PBAs included in the cooking apparatus 100 will be described.

Figure 9:
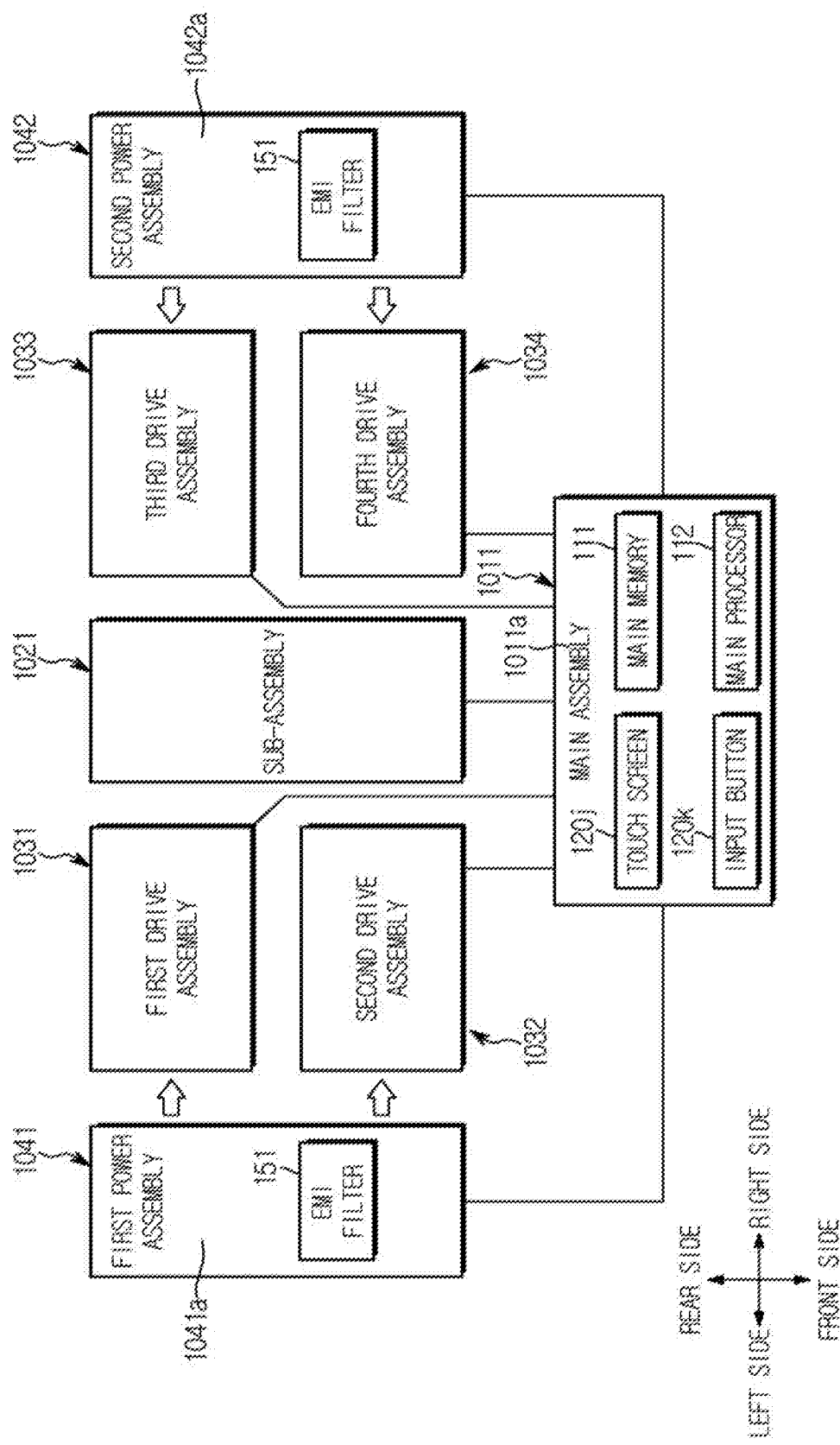
FIG. 9 is a view illustrating an example of an arrangement of a printed board assembly included in a cooking apparatus according to an embodiment.
Figure 10:
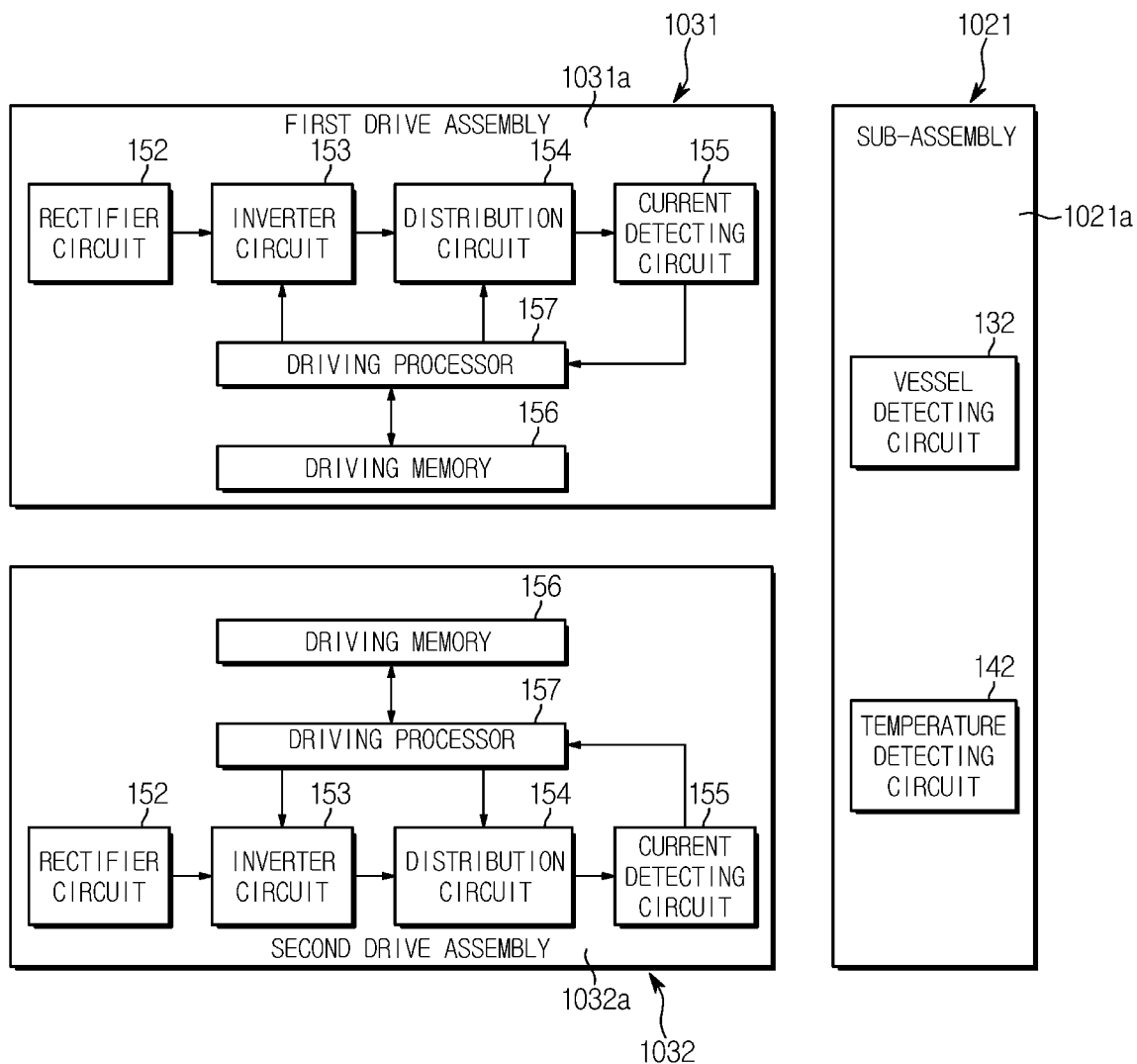
FIG. 10 is a view illustrating an example of a circuit included in a drive assembly and a sub-assembly illustrated in FIG. 9.
Figure 11:
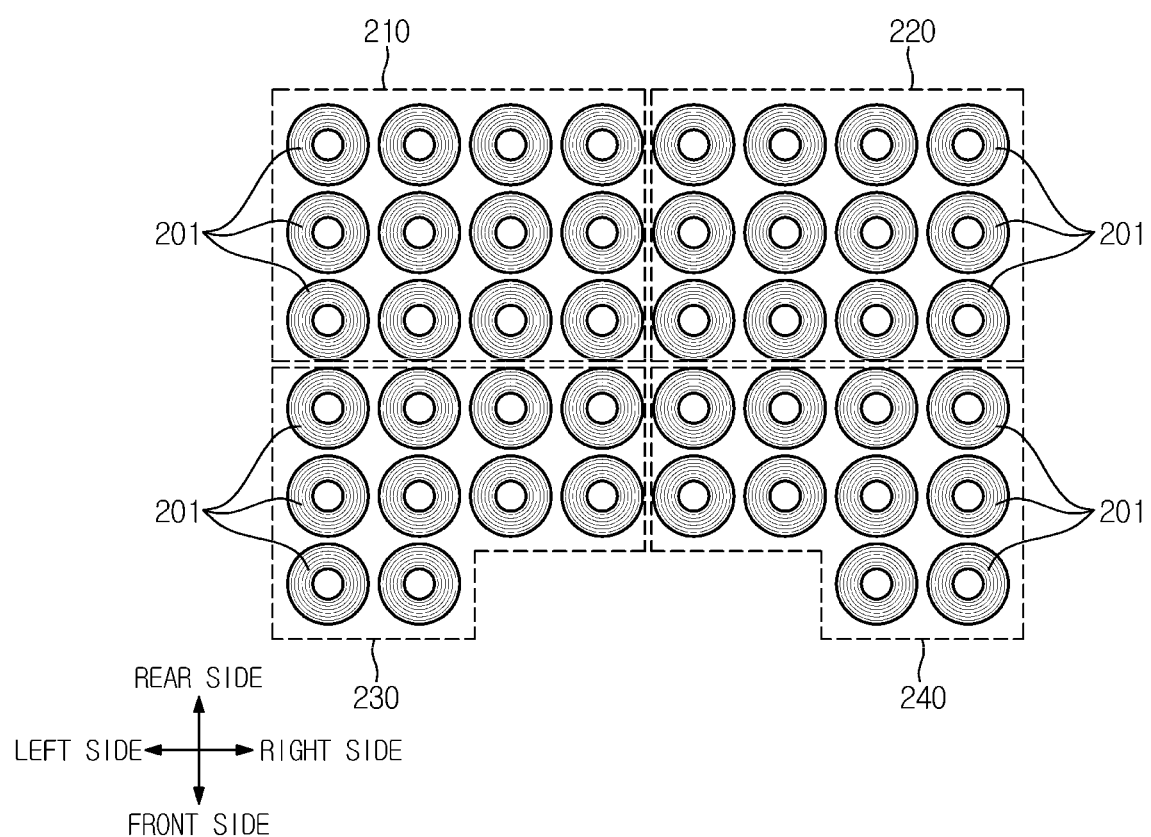
FIG. 11 is a view illustrating an example of an arrangement of an induction heating coil included in a cooking apparatus according to an embodiment.

For example, FIG. 9 is a view illustrating an example of an arrangement of a printed board assembly included in a cooking apparatus according to an embodiment. FIG. 10 is a view illustrating an example of a circuit included in a drive assembly and a sub-assembly illustrated in FIG. 9. FIG. 11 is a view illustrating an example of an arrangement of an induction heating coil included in a cooking apparatus according to an embodiment.

Referring to FIGS. 9, 10, and 11, the cooking apparatus 100 includes a main assembly 1011, a sub-assembly 1021, a first drive assembly 1031, a second drive assembly 1032, a third drive assembly 1033, and a fourth drive assembly 1034, a first power assembly 1041 (1041a), and a second power assembly 1042 (1042a).

As described above, the cooking apparatus 100 may include the user interface 120, the vessel detector 130, the temperature detector 140, the driver 150, and the controller 110. At this time, the user interface 120, the vessel detector 130, the temperature detector 140, the driver 150, and the controller 110 may be classified and grouped the plurality of components and circuits (e.g., touch screen, input button, main memory, main processor, etc.) included in the cooking apparatus 100 according to the function and operations. In other words, the user interface 120, the vessel detector 130, the temperature detector 140, the driver 150, and the controller 110 may refer to the components and circuits performing similar or identical functions, and do not refer to a physically integrated component or one PBA. Therefore, the components and the circuits included in the same configuration 110, 120, 130, 140, and 150 may be installed in different PBAs 1011, 1021, 1031, 1032, 1033, 1034, 1041, and 1042 as necessary.

For example, the main assembly 1011 may include the touch screen 120$j$, the input button 120$k$, the main memory 111, and the main processor 112. The touch screen 120$j$, the input button 120$k$, the main memory 111, and the main processor 112 may be installed on a main PCB 1011$a$. In other words, functionally, the touch screen 120$j$ and the input button 120$k$ may be included in the user interface 120, and the main memory 111 and the main processor 112 may be included in the controller 110, but physically, the main assembly 1011 may include the touch screen 120$j$, the input button 120$k$, the main memory 111, and the main processor 112 may be configured the main assembly 1011.

In addition, the main assembly 1011 may include a connection terminal for connecting the main processor 112 with the vessel detecting circuit 132 and/or the temperature detecting circuit 142 of the sub-assembly 1021, and a connection terminal for connecting the main processor 112 to the driving processor 157 of the first/second/third/fourth drive assembly 1031, 1032, 1033, and 1034.

The sub-assembly 1021 may include the vessel detecting circuit 132 and the temperature detecting circuit 142, which may be installed on a sub PBC 1021$a$. In other words, the vessel detecting circuit 132 may be functionally included in the vessel detector 130 and the temperature detecting circuit 142 may be functionally included in the temperature detector 140, but the vessel detecting circuit 132 and the temperature detecting circuit 142 may be configured the sub-assembly 1021.

As described above, the plurality of vessel sensors 131 may be installed in the vicinity of the induction heating coil 201, separated from the vessel detecting circuit 132. The vessel detecting circuit 132 may be connected to all vessel sensors 131 and may receive a cooking vessel detection result from all vessel sensors 131.

In addition, the plurality of temperature sensors 141 may be separated from the temperature detecting circuit 142 and installed in the vicinity of the induction heating coil 201. The temperature detecting circuit 142 may be connected to all the temperature sensors 141 and may receive a cooking vessel temperature from all the temperature sensors 141.

The sub-assembly 1021 may include a connection terminal for connecting the vessel detecting circuit 132 with the vessel sensors 131 near the induction heating coil 201, a connection terminal for connecting the temperature detecting circuit 142 with the temperature sensors 141 near the induction heating coil 201, and a connection terminal for connecting the vessel detecting circuit 132 and the temperature detecting circuit 142 with the main processor 112 of the main assembly 1011.

The first drive assembly 1031 may include the rectifier circuit 152, the inverter circuit 153, the distribution circuit 154, the current detecting circuit 155, the driving memory 156, and the driving processor 157. The rectifier circuit 152, the inverter circuit 153, the distribution circuit 154, the current detecting circuit 155, the driving memory 156, and the driving processor 157 may be installed on a first driving PCB 1031*a*. In other words, functionally, the rectifier circuit 152, the inverter circuit 153, the distribution circuit 154, the current detecting circuit 155, the driving memory 156, and the driving processor 157 may be included the driver 150, but physically, the rectifier circuit 152, the inverter circuit 153, the distribution circuit 154, the current detecting circuit 155, the driving memory 156, and the driving processor 157 may be configured the first drive assembly 1031. Also, the EMI filter 151 included in the driver 150 may be separately installed in the power assemblies 1041 and 1042 as described below.

In addition, the first drive assembly 1032 may include a connection terminal for connecting the driving processor 157 to the main processor 112 of the main assembly 1011, and a connection terminal for connecting the rectifier circuit 152 to the EMI filter 151 of the first power assembly 1041, and a connection terminal for connecting the distribution circuit 154 to the plurality of induction heating coils 201 belonging to the first induction heating coil group 210.

The second/third/fourth drive assembly 1032, 1033, and 1034 may have the same structure as the first drive assembly 1031. For example, the second drive assembly 1032 may include the rectifier circuit 152, the inverter circuit 153, the distribution circuit 154, the current detecting circuit 155, the driving memory 156, and the driving processor 157. The rectifier circuit 152, the inverter circuit 153, the distribution circuit 154, the current detecting circuit 155, the driving memory 156, and the driving processor 157 may be installed on a second driving PCB 1032*a*.

The driving circuits included in each of the first, second, third, and fourth drive assemblies 1031, 1032, 1033, and 1034 may supply the driving current to the plurality of induction heating coils 201. For example, the driving circuit included in each of the four drive assemblies 1031, 1032, 1033, and 1034 may supply the driving current to the forty-four induction heating coils 201. The forty-four induction heating coils 201 may be classified into four induction heating coil groups 210, 220, 230, and 240 that receive the driving currents from the four drive assemblies 1031, 1032, 1033, and 1034, respectively. For example, as illustrated in FIG. 11, the forty-four induction heating coils 201 may be classified into a first induction heating coil group 210 receiving the driving current from the driving circuit of the first drive assembly 1031, and a second induction heating coil group 220 receiving the driving current from the driving circuit of the second drive assembly 1032, a third induction heating coil group 230 receiving the driving current from the driving circuit of the third drive assembly 1033, and a fourth induction heating coil group 240 receiving the driving current from the driving circuit of the fourth drive assembly 1034.

At this time, in order to increase the degree of freedom in the position where the cooking vessel 1 is placed, it is preferable that the number of the induction heating coils belonging to one induction heating coil group is at least six, and the diameter of each of the induction heating coils is 90 mm or less.

The first power assembly 1041 may include the EMI filter 151, and the EMI filter 151 may be installed on a first power PCB 1051*a*. In other words, functionally, the EMI filter 151 may be included in the driver 150, and physically the EMI filter 151 may constitute the first power assembly 1041. If necessary, the fuse F (see FIG. 6) and the relay R (see FIG. 6) may be provided in the first power assembly 1041.

In addition, the first power assembly 1041 may include a connection terminal for connecting the EMI filter 151 with the external power source and a connection terminal for connecting the EMI filter 151 to the rectifier circuit 152 of the first/second drive assembly 1031 and 1032.

The structure of the second power assembly 1042 may be the same as the first power assembly 1042.

As described above, the components and circuits constituting the cooking apparatus 100 may be installed on the plurality of PBAs 1011, 1021, 1031, 1032, 1033, 1034, 1041, and 1042 according to functions, types of power supplied (AC power, DC power), operating frequency, and the like.

In addition, the plurality of PBAs (1011, 1021, 1031, 1032, 1033, 1034, 1041, and 1042 may be variously arranged according to the components and circuits.

For example, the main assembly 1011 including the touch screen 120*j* and the input button 120*k* of the user interface 120 may be installed inside an upper surface 101*a* of the main body 101 or inside the front surface 101*b* of the main body 101 to interact with the user.

The sub-assembly 1021 including the vessel detecting circuit 132 and the temperature detecting circuit 142 connected to the container sensor 131 and the temperature sensor 141 installed in the vicinity of the induction heating coil 201 may be installed at a central portion inside the main body 101.

In order to supply the driving current to the induction heating coil 201 belonging to the first induction heating coil group 210 located on a rear left side of the main body 101, the first drive assembly 1031 may be installed on the rear left side of the sub-assembly 1021. In order to supply the driving current to the induction heating coil 201 belonging to the second induction heating coil group 220 located on a front left side of the main body 101, the second drive assembly 1032 may be installed on the front left side of the sub-assembly 1021. In order to supply the driving current to the induction heating coil 201 belonging to the third induction heating coil group 230 located on a rear right side of the main body 101, the third drive assembly 1033 may be installed on the rear right side of the sub-assembly 1021. In addition, in order to supply the driving current to the induction heating coil 201 belonging to the fourth induction heating coil group 240 located on a front right side of the main body 101, the fourth drive assembly 1034 may be installed on the front right side of the sub-assembly 1021.

The first power assembly 1041 may be installed a left side of the first and second drive assemblies 1031 and 1032, i.e., outside of the first and second drive assemblies 1031 and 1032 to supply the AC power to the first and second drive assemblies 1031 and 1032. In addition, the second power assembly 1042 may be installed a right side of the third and fourth drive assemblies 1033 and 1034, that is, outside of the third and fourth drive assemblies 1033 and 1034 to supply the AC power to the third and fourth assemblies 1033 and 1034.

By arranging the plurality of PBAs 1011, 1021, 1031, 1032, 1033, 1034, 1041, and 1042 as illustrated in FIG. 9, the length and number of wires connecting between the plurality of PBAs 1011, 1021, 1031, 1032, 1033, 1034, 1041, and 1042 may be minimized, and crossing of the wires may be minimized.

The circuits installed in the drive assemblies 1031, 1032, 1033, and 1034 and the sub-assembly 1021 are not limited to those illustrated in FIG. 10.

Meanwhile, the cooking apparatus 100 described above may include a cooking area 400 capable of heating an actual cooking vessel among the cooking plates 102. The cooking area 400 may refer to an area corresponding to the plurality of induction heating coils 201 installed at the bottom of the cooking plate 102, and may be provided as an entire area or a partial area of the cooking plate 102. When the cooking vessel 1 is placed on the cooking area 400, the sub-assembly 311 of the cooking apparatus 100 may heat the cooking vessel 1 by determining the plurality of induction heating coils 201 overlapping the cooking vessel 1 and distributing the driving current to the induction heating coils 201 through the drive assemblies 321, 322, 323, and 324. At this time, if there is no separate input, the cooking apparatus 100 according to the embodiment may heat the cooking apparatus 100 placed on the cooking area 400 through the entire cooking area 400. That is, the cooking apparatus 100 in an initial state before being input from the outside may heat the cooking vessel 1 through the cooking area 400 in a non-compartment state.

On the other hand, the cooking apparatus 100 according to the embodiment may receive the compartment command that divides the cooking area 400 into a plurality of sub-areas. When the compartment command is input, the plurality of sub-area of the cooking apparatus 100 may individually operate as in the cooking area 400 described above.

That is, the cooking vessel 1 may be placed in each of the plurality of sub-areas, and the sub-assembly 311 may determine the induction heating coil group corresponding to the sub-area where the cooking vessel 1 is placed. When a determination result of the sub-assembly 311 is output to the controller 110, the controller 110 may identify the drive assemblies 321, 322, 323, and 324 capable of supplying the driving current to the induction heating coil group corresponding to the sub-area where the cooking vessel 1 is placed, and may control the identified drive assemblies 321, 322, 323, and 324 to distribute the driving current to the induction heating coil overlapping the cooking vessel 1.

Hereinafter, a method in which the cooking apparatus 100 according to the embodiment receives the compartment command and operates according to the received compartment command will be described in detail.

Figure 12:
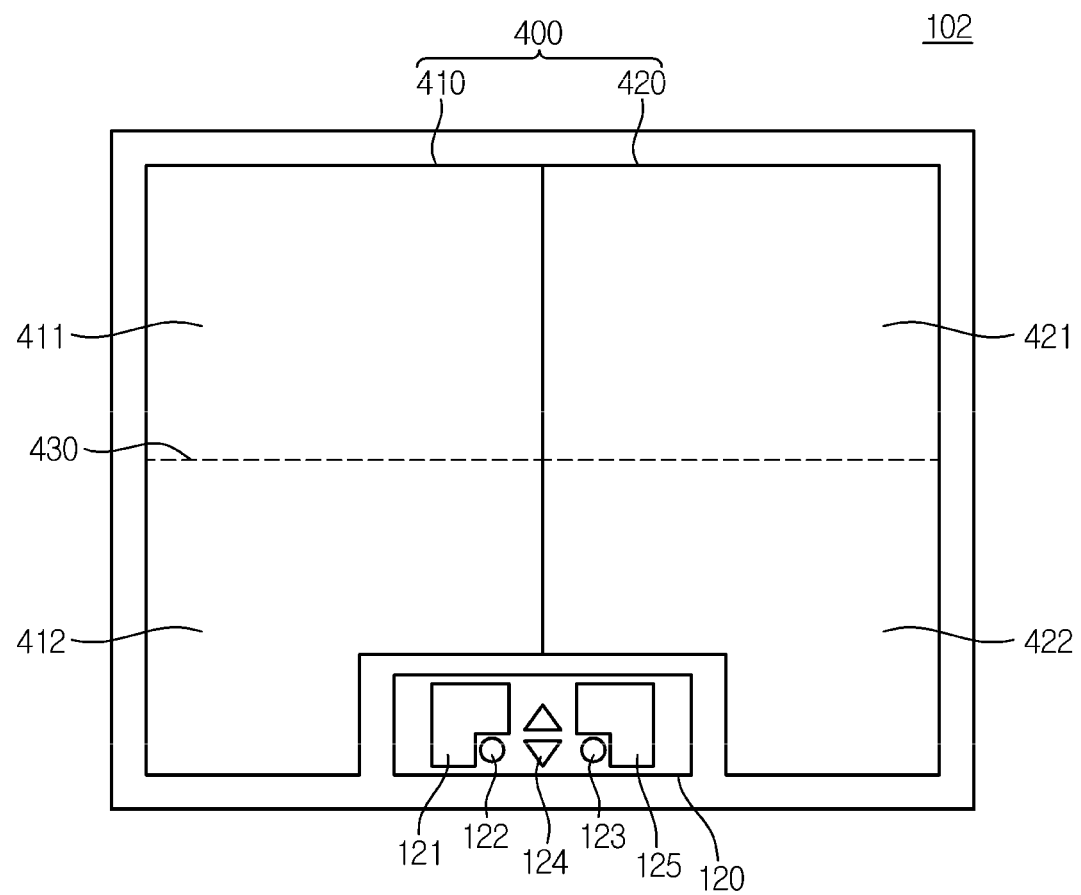
FIG. 12 is a plan view of a cooking plate of a cooking apparatus according to an embodiment.
Figure 13A:
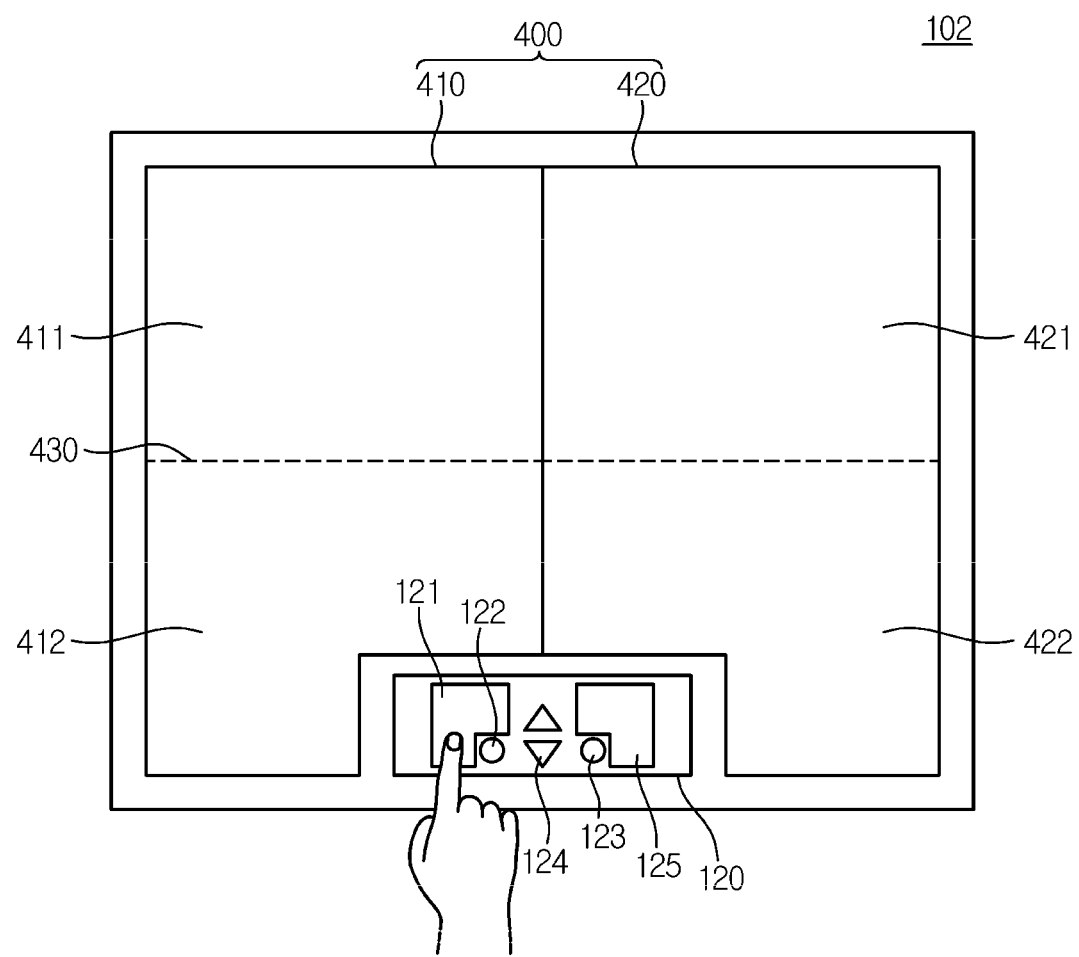
FIGS. 13A to 13C are views for describing the operation of the cooking apparatus of FIG. 12 when a non-compartment command is input.
Figure 13B:
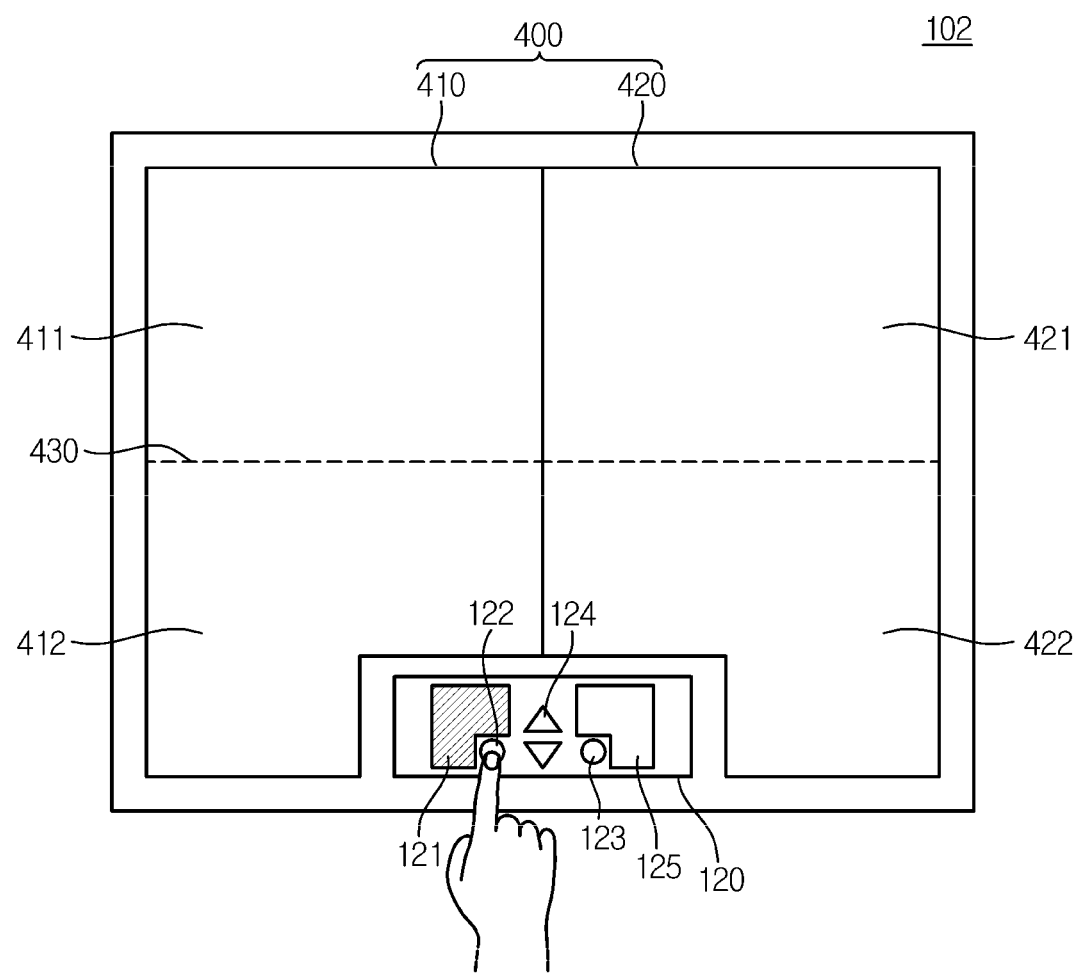
Figure 13C:
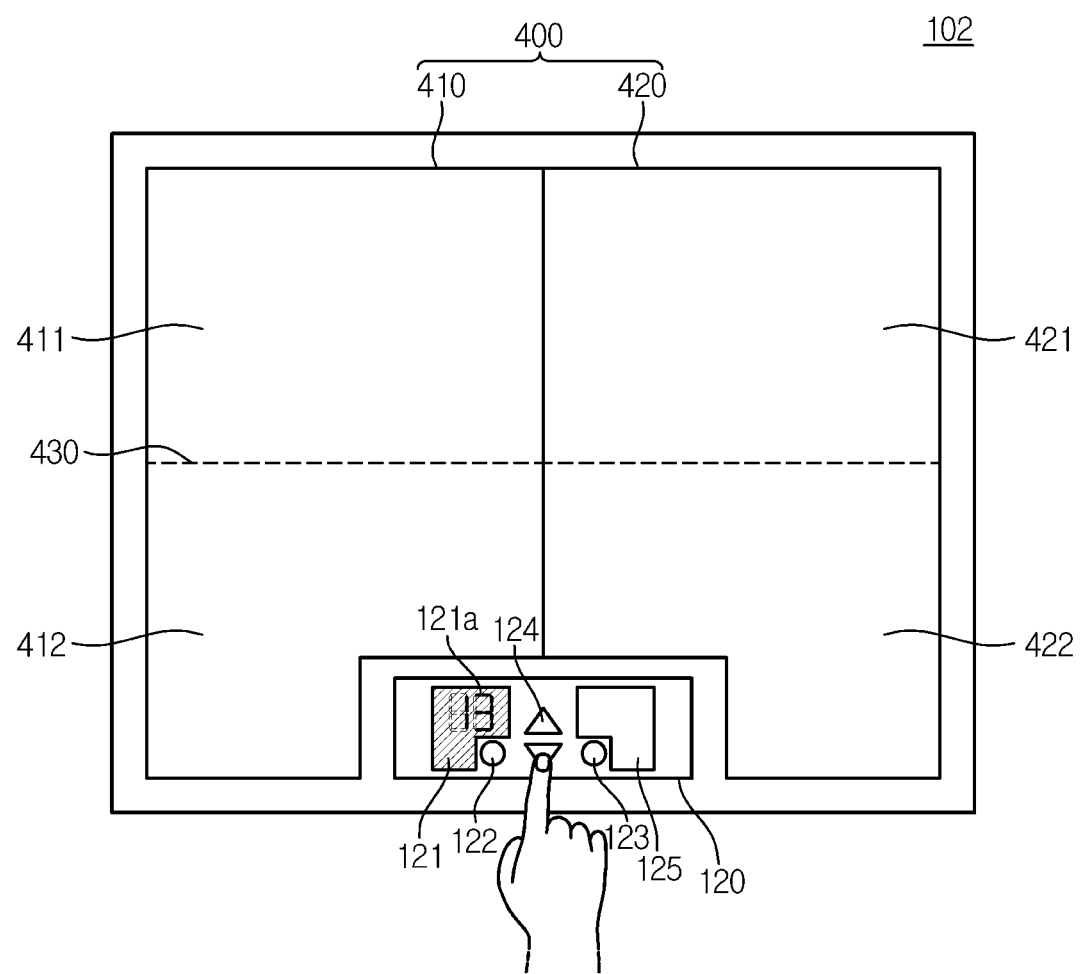
Figure 14A:
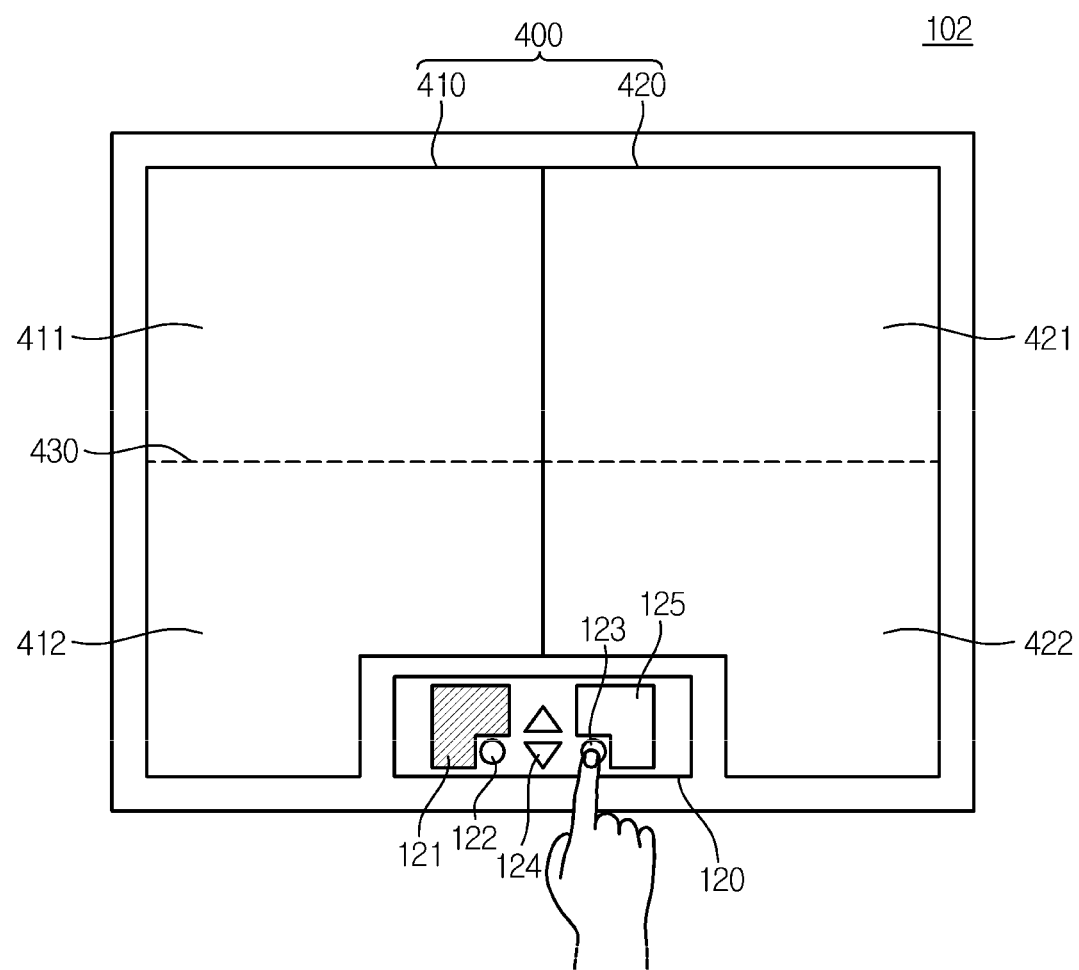
FIGS. 14A to 14C are views for describing the operation of the cooking apparatus of FIG. 12 when a compartment command is input.
Figure 14B:
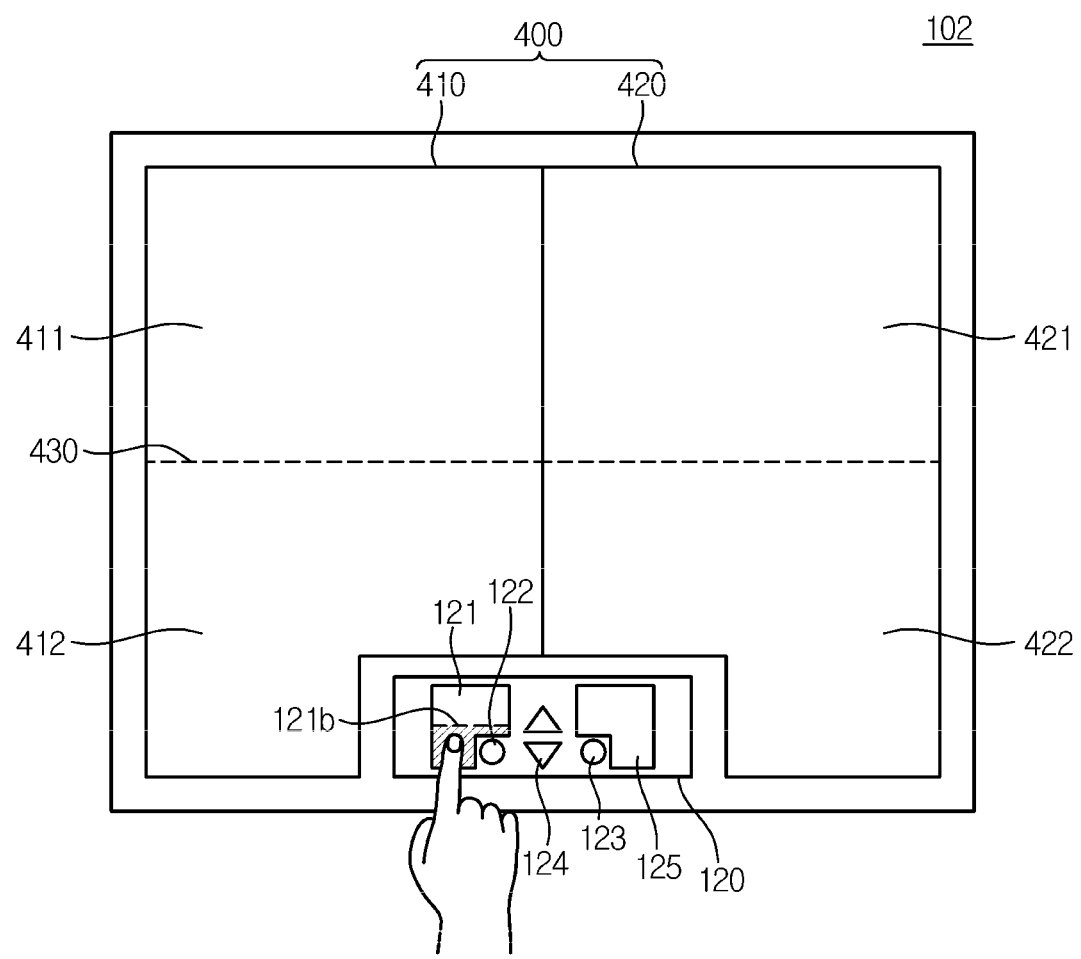
Figure 14C:
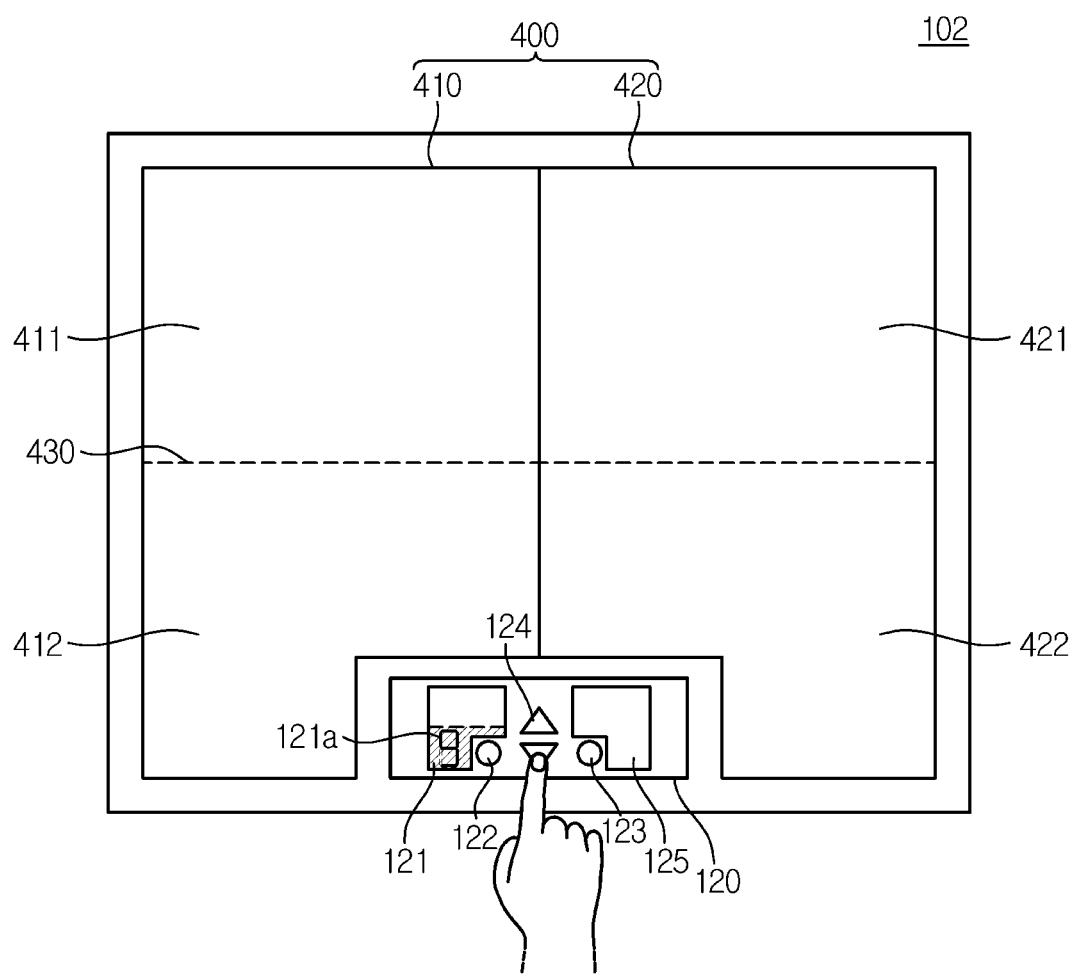

FIG. 12 is a plan view of a cooking plate of a cooking apparatus according to an embodiment, FIGS. 13A to 13C are views for describing the operation of the cooking apparatus of FIG. 12 when a non-compartment command is input, and FIGS. 14A to 14C are views for describing the operation of the cooking apparatus of FIG. 12 when a compartment command is input.

Referring to FIG. 12, a border line may be printed on a border of the cooking area 400 to guide the cooking area 400 to the user on the cooking plate 102. The cooking area 400 may be formed inside the printed border line.

Since the cooking area 400 is set to the area corresponding to the plurality of induction heating coils 201 arranged in the heating layer 200, the cooking area 400 may be set as a first area 410 corresponding to the first induction heating coil group 210 and the third induction heating coil group 230 and a second cooking area 420 corresponding to the second induction heating coil group 220 and the fourth induction heating coil group 240.

In addition, a compartment line 430 dividing the cooking area 400 into the plurality of sub-areas may be printed on the cooking plate 102. The plurality sub-areas may be defined based on the printed compartment line 430.

The plurality of sub-areas may be set to the area corresponding to each of the induction heating coils 201. Particularly, a first sub-area 411 of a first cooking area 410 may correspond to the first induction heating coil group 210, and a second sub-area 412 of the first cooking area 410 may correspond to the third induction heating coil group 230. In addition, a third sub-area 421 of the second cooking area 420 may correspond to the second induction heating coil group 220, and a fourth sub-area 422 of the second cooking area 420 may correspond to the fourth induction heating coil group 240.

In addition, the user interface 120 may be provided on the cooking plate 102. Hereinafter, for convenience of description, it is assumed that the user interface 120 is provided on the cooking plate 102, but the position where the user interface 120 is provided is not limited.

The user interface 120 may be implemented in various methods within a technical idea of receiving the control command from the user and displaying information about the cooking apparatus 100. However, hereinafter, for convenience of description, it is assumed that the user interface 120 is implemented as the touch screen 120*j*.

The user interface 120 of FIG. 12 illustrates a case in which a first cooking area selector 121, a non-compartment command inputter 122, a compartment command inputter 123, a temperature setter 124, and a second cooking area selector 125. Since the user interface 120 of FIG. 12 is implemented as the touch screen 120*j*, the first cooking area selector 121, the non-compartment command inputter 122, the compartment command inputter 123, the temperature setter 124, and the second cooking area selector 125 may be implemented in a form of an icon that receives the control command through the touch. However, since the configuration of the user interface 120 is only the embodiment of the disclosure, the user interface 120 may include only a part of the above-described configuration, or may further include a configuration other than the above-described configuration. It may also be possible that the above-described configuration is implemented as means other than an icon.

The first cooking area selector 121 and the second cooking area selector 125 may receive a selection command for which cooking area 400 the control command is to be input. If the selection command is input through the first cooking area selector 121, the user interface 120 may switch to a state in which the control command for the first cooking area 410 is input. On the other hand, when the selection command is input through the second cooking area selector 125, the user interface 120 may be switched to a state in which the control command for the second cooking area 420 is received.

The first cooking area selector 121 may be provided in a shape corresponding to the first cooking area 410 and the second cooking area selector 125 may be provided in a shape corresponding to the second cooking area 420 so that the user can intuitively recognize the corresponding cooking area 400.

Since the method for receiving the non-compartment command and the compartment command for the first cooking area 410 and operating the cooking apparatus 100 accordingly is the same as that for the second cooking area 420, the following description will focus on the first cooking area 410.

Referring to FIG. 13A, the user's touch may be detected through the first cooking area selector 121 displayed on the user interface 120 implemented as the touch screen 120*j*. The user interface 120 may recognize the touch detected on the first cooking area selector 121 as the selection command of the first cooking area 410, and may be switched to the state in which the control command for the first cooking area 410 is received.

When the selection command of the first cooking area 410 is input, the cooking apparatus 100 according to the embodiment may preferentially heat the cooking vessel 1 placed on the cooking area 400 through the entire cooking area 400. That is, the cooking apparatus 100 in the initial state before a separate compartment command is input may heat the cooking vessel 1 through the cooking area 400 in the non-compartment state.

When before the compartment command is input, the user interface 120 may inform the user that the first cooking area 410 is not divided. For example, as illustrated in FIG. 13B, the user interface 120 may shade the entire interior of the first cooking area selector 121 having the shape corresponding to the first cooking area 410. Then, in order to set a heating temperature level of the cooking vessel 1 located with respect to the entire first cooking area 410, the user may input a temperature setting command in the user interface 120. Referring to FIG. 13C, the user's touch may be detected through the temperature setter 124 displayed on the user interface 120 implemented as the touch screen 120*j*. The user interface 120 may recognize the touch detected on the temperature setter 124 as the temperature setting command for the cooking vessel 1 placed in the first cooking area 410 and output the result to the controller 110.

At this time, the user interface 120 may notify the user by displaying a temperature level 121*a* set according to the user's input. For example, as illustrated in FIG. 13C, the user interface 120 may simultaneously display the temperature level 121*a* inside the first cooking area selector 121 having the shape corresponding to the first cooking area 410.

At the same time, the sub-assembly 311 may determine the plurality of induction heating coils 201 overlapping the cooking vessel 1 placed on the cooking area 400. The controller 110 may control the drive assembly 321, 322, 323, and 324 so as to heat the cooking vessel 1 to the set temperature by distributing the driving current corresponding to a target temperature according to the set temperature level of the determined plurality of induction heating coils 201.

Meanwhile, when it is desired to divide the first cooking area 410 and heat a plurality of cooking vessels, the user may input the compartment command in the user interface 120. Referring to FIG. 14A, the user's touch may be detected through the compartment command inputter 123 displayed on the user interface 120 implemented as the touch screen 120*j*. The user interface 120 may recognize the touch detected on the compartment command inputter 123 as the compartment command for the first cooking area 410, and may divide the first cooking area 410 into the first sub-area 411 and the second sub-area 412. The cooking apparatus 100 may heat each of the cooking vessels placed for each sub-area thus divided.

At this time, the user interface 120 may inform the user that the first cooking area 410 is divided into the first sub-area 411 and the second sub-area 412. For example, as illustrated in FIG. 14B, the user interface 120 may divide the interior of the first cooking area selector 121 having the shape corresponding to the first cooking area 410 by a sub compartment line 121*b*.

Then, in order to one sub-area among the divided first cooking areas 410, the user may input a sub-area selection command. Particularly, the user's touch may be detected through an area corresponding to a desired sub-area among inner areas of the first cooking area selector 121 divided by the sub compartment line 121*b*. FIG. 14B illustrates a case where the user touches a lower area of the inner area of the first cooking area selector 121 corresponding to the second sub-area 412 which is the lower area of the first cooking area 410. Through this, the user interface 120 may be switched to the state in which the selection command of the second sub-area 412 is received and the control command for the second sub-command is received. In addition, the user interface 120 may apply a shadow to the lower area of the first cooking area 410.

Then, to set the heating temperature level of the cooking vessel 1 located with respect to the second sub-area 412 of the first cooking area 410, the user may input the temperature setting command in the user interface 120. Referring to FIG. 14C, the user's touch may be detected through the temperature setter 124 displayed on the user interface 120 implemented as the touch screen 120*j*. The user interface 120 may recognize the touch detected on the temperature setter 124 as the temperature setting command for the cooking vessel 1 placed on the second sub-area 412, and may output the result to the controller 110.

At this time, the user interface 120 may notify the user by displaying the temperature level 121*a* set according to the user's input. For example, as illustrated in FIG. 14C, the temperature level 121*a* in the lower area corresponding to the second sub-area 412 among the inner areas of the first cooking area selector 121 having the shape corresponding to the first cooking area 410.

At the same time, the sub-assembly 311 may determine the third induction heating coil group 230 as the plurality of induction heating coil groups corresponding to the second sub-area 412 of the cooking area 400. The controller 110 may control the drive assembly 321, 322, 323, and 324 to distribute the driving current to the determined plurality of induction heating coils 201 to heat the cooking vessel 1 to the set temperature. Particularly, the controller 110 may distribute the driving current corresponding to the target temperature according to the temperature level set in the induction heating coil 201 overlapping the second sub-area 412 by controlling the third drive assembly 323 capable of supplying the driving current to the third induction heating coil group 230.

Through this, the user may freely arrange and heat one cooking vessel 1 at the desired location of the cooking area 400, and also divide the cooking area 400 into the plurality of sub-areas, thereby locating and heating each of the cooking vessels at the desired position of each of the sub-areas. Through this, the degree of freedom for the number of cooking vessels 1 placed as well as the position where the cooking vessels 1 are placed increases, so that the user's usability for the cooking apparatus 100 may be increased.

In addition, when the number of inputs of the compartment command and the cooking vessel 1 are to be located with respect to the entire first cooking area 410, the user may input the non-compartment command into the user interface 120. Particularly, the user's touch may be detected through the non-compartment command inputter 122 displayed on the user interface 120 implemented as the touch screen 121.

The user interface 120 may recognize the touch detected on the non-compartment command inputter 122 as the non-compartment command for the first cooking area 410 and output the result to the controller 110.

So far, the case where the induction heating coils 201 of the same shape are arranged in the heating layer 200 has been described. Alternatively, the induction heating coils 201 of different shapes may be arranged together in the heating layer 200.

Figure 15:
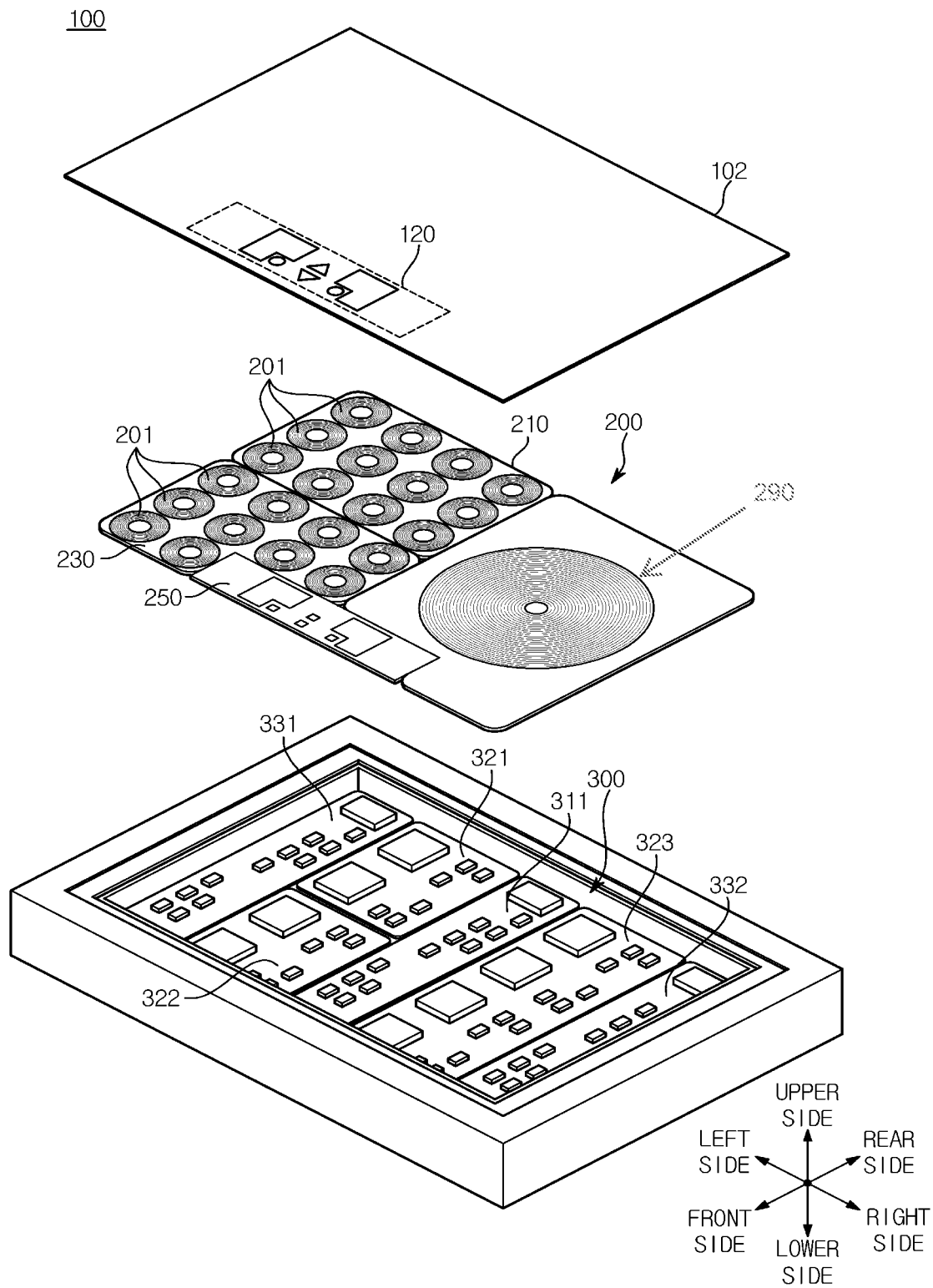
FIG. 15 is a view illustrating an interior of a cooking apparatus according to another embodiment.
Figure 16:
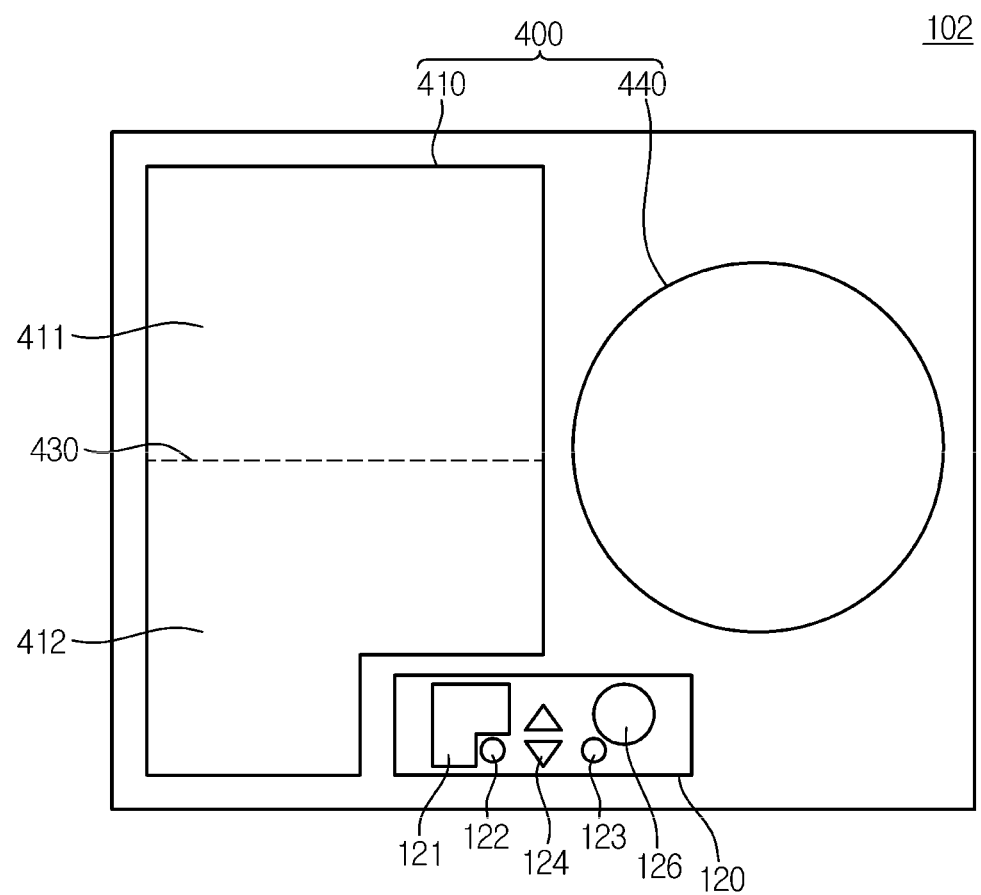
FIG. 16 is a plan view of a cooking plate according to another embodiment.

FIG. 15 is a view illustrating an interior of a cooking apparatus according to another embodiment, and FIG. 16 is a plan view of a cooking plate according to another embodiment. Since the embodiment of FIG. 15 differs from FIG. 2 only in the arrangement of the induction heating coil 201 and the absence of the fourth drive assembly 324, the following description will be mainly focused on the above-described difference.

Referring to the heating layer of FIG. 15, together with the first induction heating coil group 210 and the second induction heating coil group 220, one induction heating coil 290 for a fixed area may be provided. The induction heating coil 290 for the fixed area may be present in FIG. 2 at a position where the third induction heating coil group 230 and the fourth induction heating coil group 240 are provided.

The induction heating coil 290 for the fixed area may be a circular induction heating coil having a diameter of 140 mm or more. This is because the induction heating coil 290 for one fixed area needs to have a diameter sufficient to heat the entire bottom surface of one cooking vessel.

In addition, referring to the PBA 300 of FIG. 15, along with the first drive assembly 321 for supplying the driving current to the first induction heating coil group 210 and the driving current for supplying the driving current to the second induction heating coil group 220, only the third drive assembly 322 for supplying the driving current to the induction heating coil 290 for the fixed area may be present.

Depending on the arrangement of the induction heating coil, the cooking area 400 may also be set differently. On the cooking plate 102 of FIG. 16, it may be identified that the border line different from that of FIG. 12 is printed. Particularly, the first cooking area 410 formed to the left and a third cooking area 440 formed to the right may be set on the cooking plate 102.

Here, the third cooking area 440 may be provided to correspond to the shape of the induction heating coil 290 for the fixed area at the bottom, and heating may be possible only for the entire area. In addition, the user interface 120 may provide a third cooking area selector 126 that selects the state capable of receiving the control command for the third cooking area 440.

Together with FIGS. 15 and 16, even when different induction heating coils are arranged in the heating layer, since the first cooking area 410 may be divided into the plurality of sub-areas by the compartment line 430, and the plurality of induction heating coil groups are disposed at the bottom of each of the plurality of sub-areas, the cooking apparatus 100 is the same as described through FIGS. 12 to 14.

On the other hand, until now, the user interface 120 has illustrated the case where the compartment command inputter 123 and the non-compartment command inputter 122 are provided, but unlike this, it may be possible to provide only an inputter that sets whether or not to have one compartment.

Figure 17:
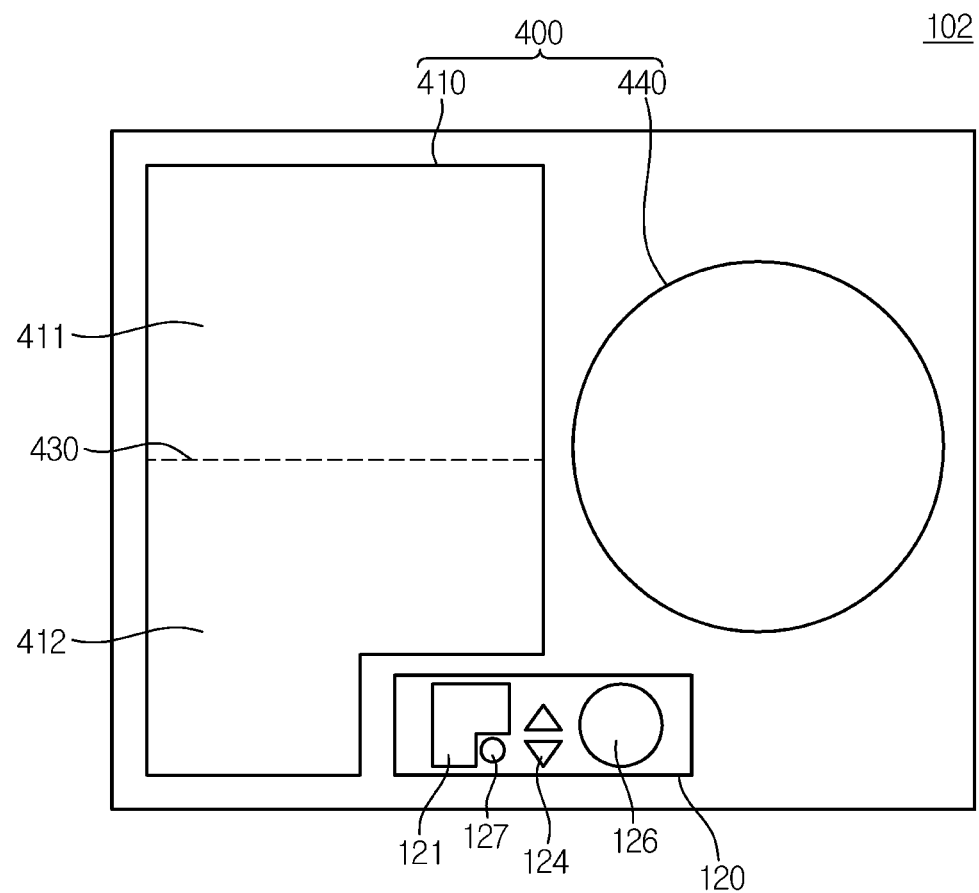
FIG. 17 is a plan view of a cooking plate of a cooking apparatus according to another embodiment.
Figure 18A:
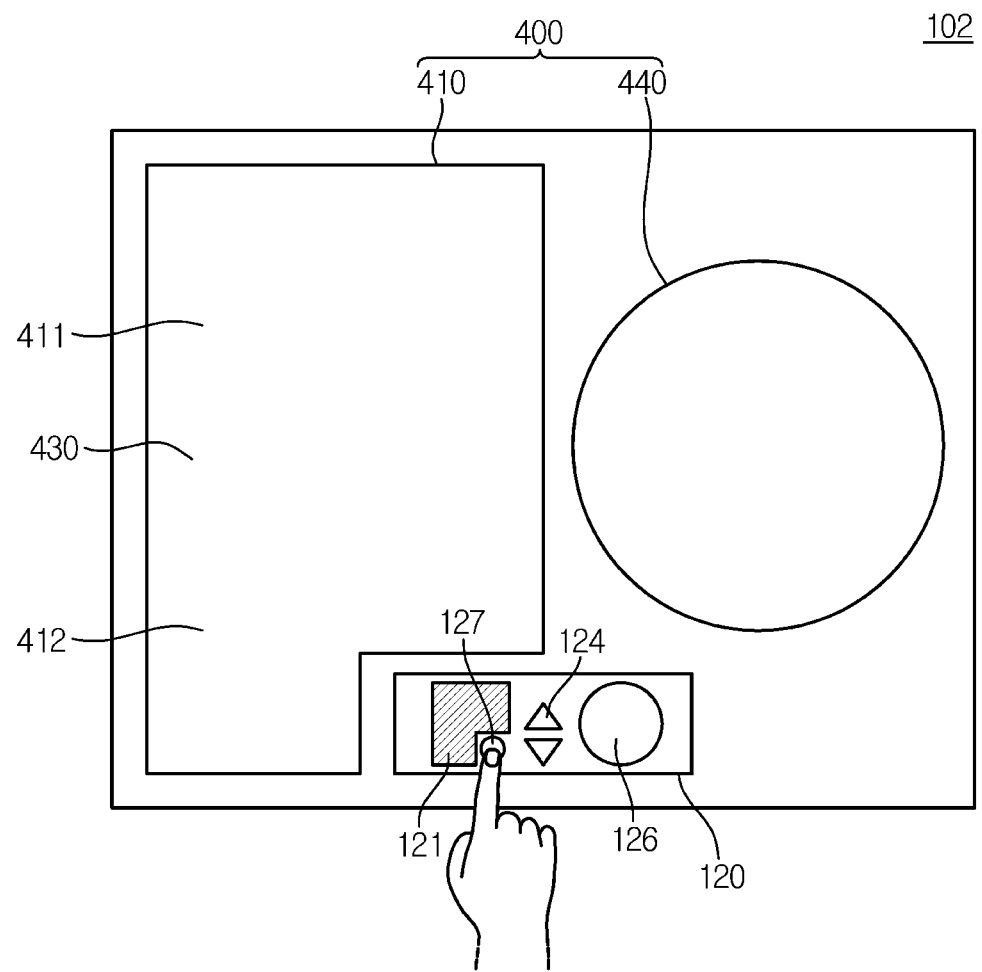
FIGS. 18A and 18B are views for describing the operation of the cooking apparatus of FIG. 17 when a compartment setting command is input.
Figure 18B:
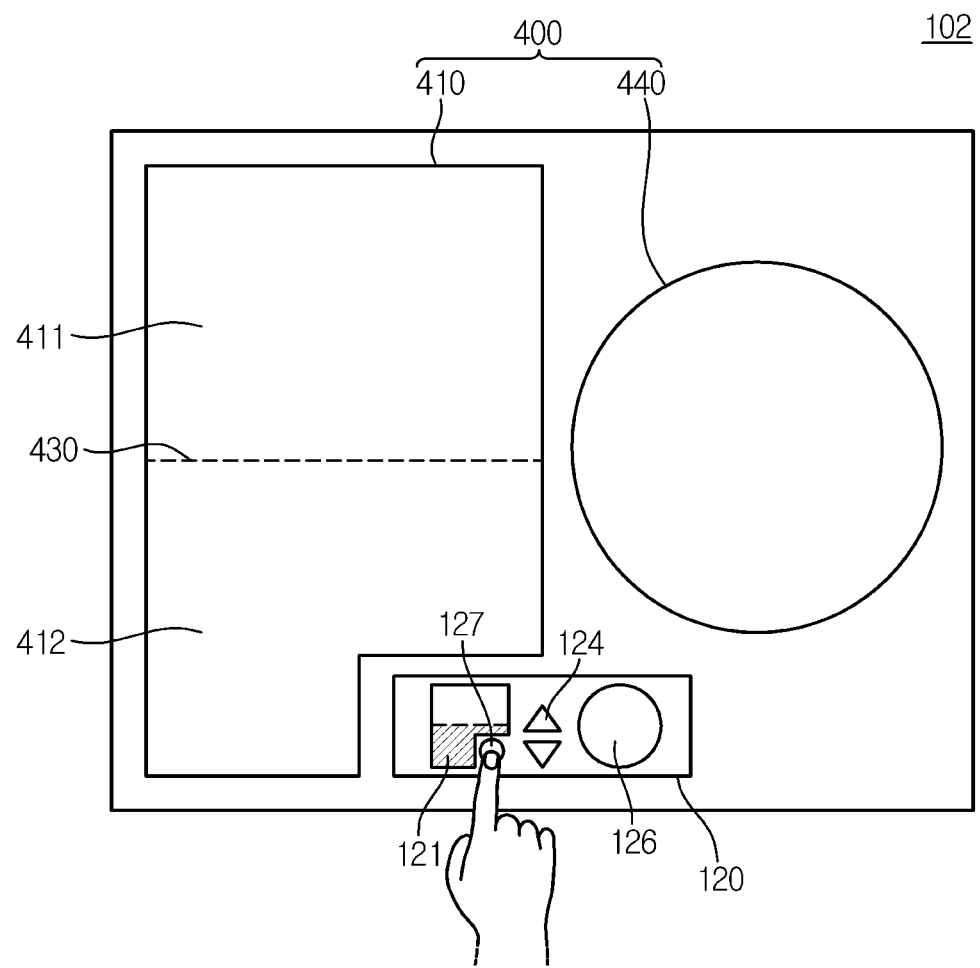

FIG. 17 is a plan view of a cooking plate of a cooking apparatus according to another embodiment, and FIGS. 18A and 18B are views for describing the operation of the cooking apparatus of FIG. 17 when a compartment setting command is input.

FIGS. 17 and 18 are related to the case where a compartment setting command inputter 127 is provided instead of the compartment command inputter 123 and the non-compartment command inputter 122, so a duplicate description with FIG. 12 is avoided, and only the differences are described.

Referring to FIG. 17, the user interface 120 may provide the compartment setting command inputter 127 that receives the compartment setting command. The compartment setting command inputter 127 may receive the compartment command or the non-compartment command according to the number of consecutive control commands.

In FIG. 18A, it is assumed that the selection command for the first cooking area 410 is input. The cooking apparatus 100 according to the embodiment may be set to heat the cooking vessel placed on the cooking area 400 through the entire cooking area 400 that is not first divided.

When the user touches the compartment setting command inputter 127 once, the user interface 120 may recognize that the compartment command for the first cooking area 410 has been input.

On the other hand, as illustrated in FIG. 18B, when the user touches the compartment setting command inputter 127 twice in succession, the user interface 120 may recognize that the compartment command for the first cooking area 410 is input.

In addition, the cooking area 400 may be divided into three or more sub-area. That is, the plurality of induction heating coil groups are provided at the bottom of each of the plurality of sub-areas. Each of the plurality of induction heating coil groups within the technical idea that the driving current is supplied by the plurality of drive assemblies 321, 322, 323, and 324, there is no limit to the number of sub-areas in which the cooking area 400 is divided.

Figure 19:
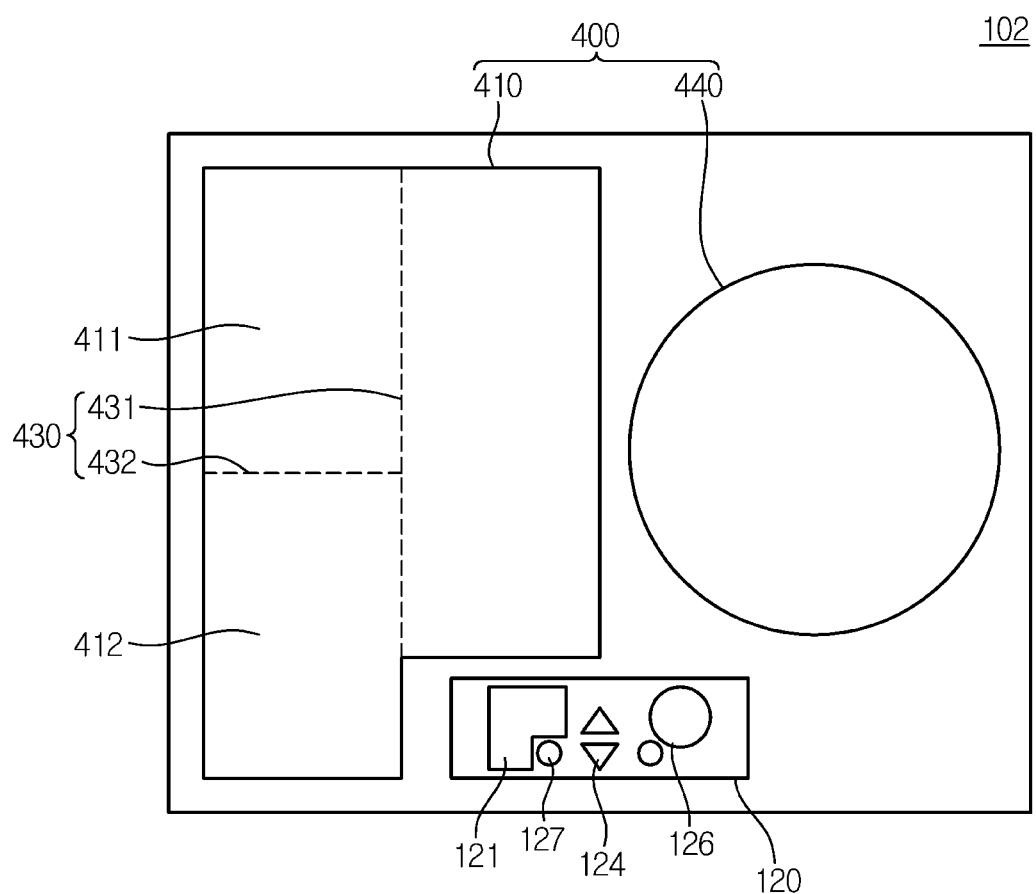
FIG. 19 is a plan view of a cooking plate of a cooking apparatus according to another embodiment.
Figure 20B:
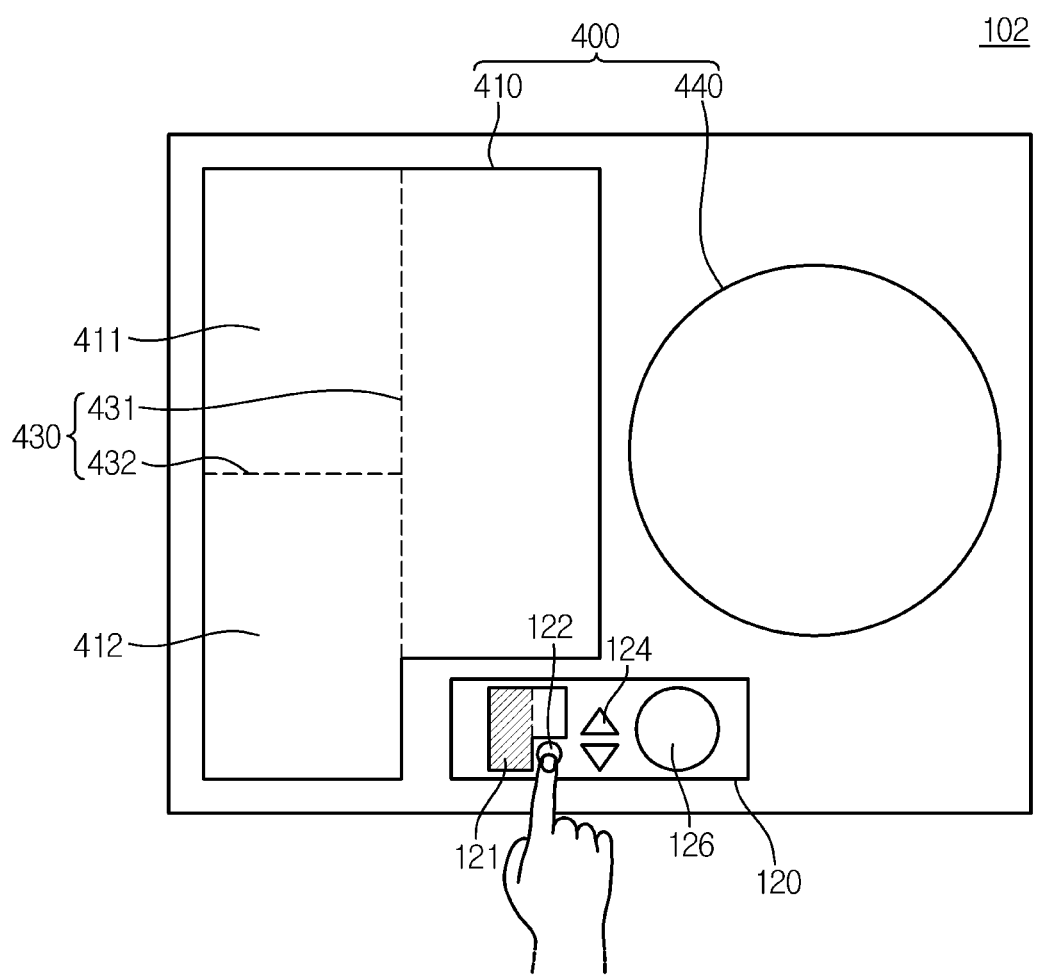
Figure 20C:
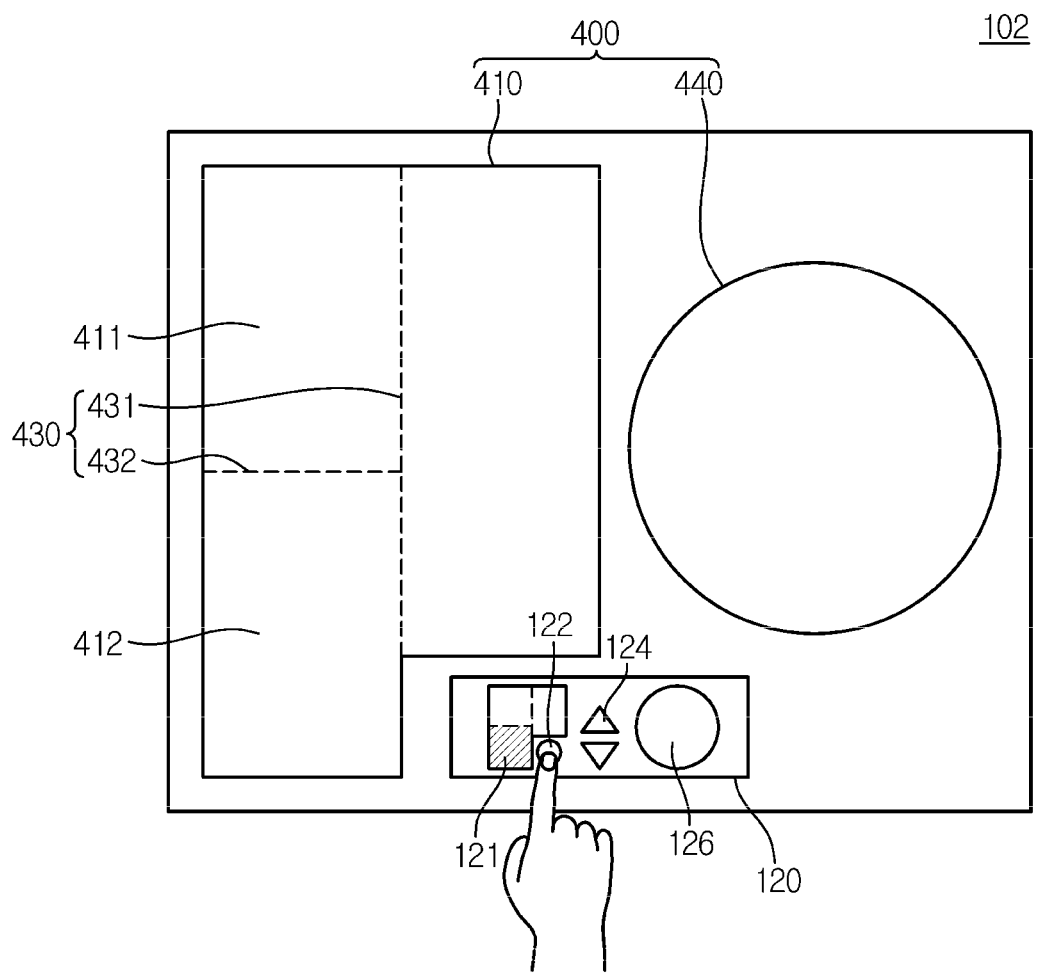

FIG. 19 is a plan view of a cooking plate of a cooking apparatus according to another embodiment, and FIGS. 20A and 20C are views for describing the operation of the cooking apparatus of FIG. 19 when a compartment setting command is input.

As described above, the cooking area 400 may be divided into a number of sub-area corresponding to the number of induction heating coil groups at the bottom. In the case of FIG. 19, a case where the cooking area 400 is divided into three sub-area is illustrated.

To this end, on the cooking plate 102, the border line including a first compartment line 431 vertically dividing the cooking area 400 and a second compartment line 432 horizontally dividing the divided sub-area may be printed.

Referring to FIG. 20A, when the user touches the compartment setting command inputter 127 once, the user interface 120 may recognize that the non-compartment command for the first cooking area 410 is input.

On the other hand, as illustrated in FIG. 20B, when the user touches the compartment setting command inputter 127 twice in succession, the user interface 120 may recognize that the first compartment command for the first cooking area 410 is input. The user interface 120 may divide the interior of the first cooking area selector 121 by the first sub compartment line as feedback for input of the compartment command. Through this, the user may intuitively recognize the shape in which the cooking area 400 is divided into the plurality of sub-areas.

In addition, as illustrated in FIG. 20C, when the user touches the compartment setting command inputter 127 three times in succession, the user interface 120 may recognize that the second compartment command for the first cooking area 410 is input. The user interface 120 may divide the interior of the first cooking area selector 121 by the second sub compartment line together with the first sub compartment line as feedback for the input of the compartment command.

In addition, the case where the user interface 120 is implemented as the touch screen 120*j* has been exemplified so far. However, since this is only an implementation embodiment of the user interface 120, the user interface 120 according to the embodiment may be implemented in various ways.

Figure 21:
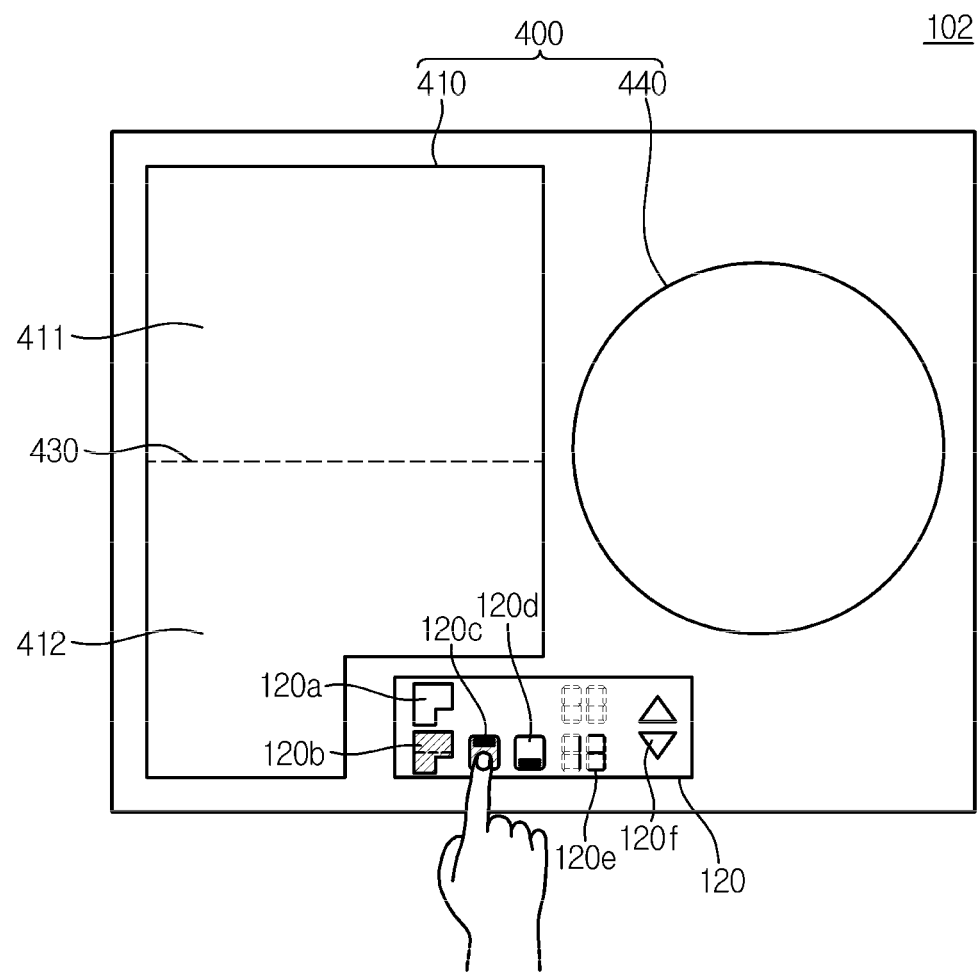
FIG. 21 is a plan view of a cooking plate according to another embodiment.
Figure 22:
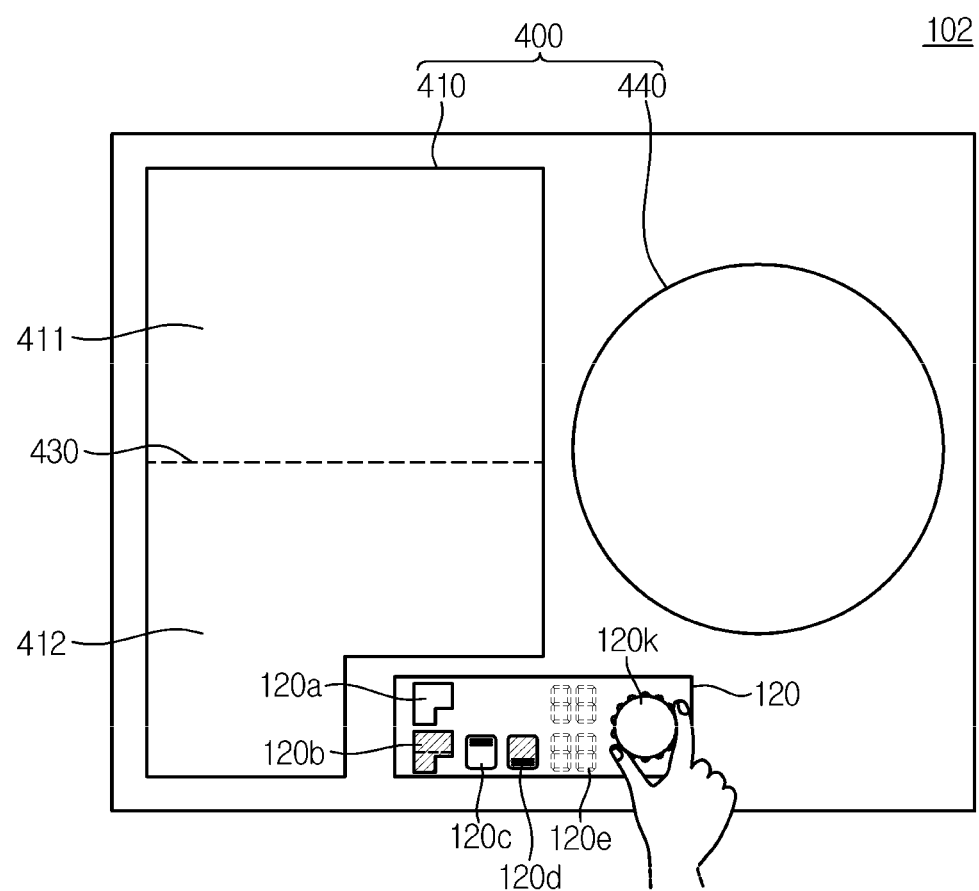
FIG. 22 is a plan view of a cooking plate according to another embodiment.

FIG. 21 is a plan view of a cooking plate according to another embodiment, and FIG. 22 is a plan view of a cooking plate according to another embodiment.

Referring to FIG. 21, the user interface 120 may be implemented by combining a 7-segment and a touch panel. As a result, the user interface 120 may include a non-compartment selection guider 120*a*, a compartment selection guider 120*b*, a first sub-area selector 120*c*, a second sub-area selector 120*d*, a temperature level guider 120*e*, and a temperature selector 120*f*.

In the case of FIG. 21, the user interface 120 may guide that the first cooking area 410 is divided by applying the shadow to the compartment selection guider 120*b*. At this time, when the user touches the first sub-area selector 120*c*, the user interface 120 may enter a state in which the control command for the first sub-area 411 is received.

In FIG. 21, a case where the compartment command and the non-compartment command are received by the touch is illustrated. Alternatively, the user interface 120 may receive the compartment command and/or the non-compartment command by operating the input button 120*k* implemented as the toggle button.

Referring to FIG. 22, the user interface 120 may guide that the first cooking area 410 is divided by applying the shadow to the compartment selection guider 120*b*. At this time, the user may rotate the input button 120*k* implemented as the toggle button, so that the compartment/non-compartment command for the first cooking area 410, a sub-area selection change command, and the control command for the selected sub-area.

FIG. 23 is a flowchart illustrating a method of controlling a cooking apparatus according to an embodiment.

First, the cooking apparatus may identify whether the selection command for the cooking area 400 has been input (900). When the selection command for the cooking area 400 has not been input, the cooking apparatus 100 may repeatedly identify whether the selection command for the cooking area 400 has been input.

On the other hand, when the selection command for the cooking area 400 is input, the cooking apparatus 100 may display that the area corresponding to the input command is selected (910).

Then, the cooking apparatus 100 may determine at least one induction heating coil group corresponding to the selected area (920).

When the induction heating coil group is determined, the cooking apparatus 100 may identify the induction heating coil overlapping the position of the cooking vessel placed in the selected area among the determined at least one induction heating coil group (930).

After identifying the overlapping induction heating coil, the cooking apparatus 100 may confirm whether the temperature setting command for the cooking vessel has been input (940). When the temperature setting command has not been input, the cooking apparatus 100 may repeatedly identify whether the temperature setting command for the cooking vessel has been input.

On the other hand, when the temperature setting command is input, the cooking apparatus 100 may distribute the driving current determined according to the temperature setting command to the identified induction heating coil (950).

The invention claimed is:

1. A cooking apparatus comprising:
    a cooking plate including a cooking area divided into a plurality of sub-areas;
    a plurality of induction heating coil groups at a bottom of the cooking plate to respectively correspond to each sub-area of the plurality of sub-areas of the cooking area, each induction heating coil group of the plurality of induction heating coil groups including a plurality of induction heating coils;
    a plurality of drive assemblies configured to respectively correspond to the plurality of induction heating coil groups, each drive assembly of the plurality of drive assemblies configured on a printed board assembly (PBA) that is separate from other drive assemblies of the plurality of drive assemblies, and each drive assembly of the plurality of drive assemblies respectively configured to supply a driving current to the corresponding induction heating coil group of the plurality of induction heating coil groups;
    a user interface configured to receive a compartment command that is input requesting a partial area of one sub-area within the plurality of sub-areas of the cooking plate to be partially operated so that a partial portion of the induction heating coil group, among the plurality of induction heating coil groups, corresponding to the one sub-area is operated;
    a sub-assembly configured to determine the partial portion of the induction heating coil group, among the plurality of induction heating coil groups, based on placement of a cooking vessel when the compartment command is input; and
    a controller configured to control a drive assembly, among the plurality of drive assemblies, corresponding to the induction heating coil group to supply a respective driving current to the determined partial portion of the induction heating coil group such that a preset target temperature is distributed to the partial portion of the induction heating coil group, thereby operating the partial portion of the induction heating coil group.

2. The cooking apparatus according to claim 1, wherein the sub-assembly is separated from the plurality of drive assemblies.

3. The cooking apparatus according to claim 1, wherein, when the compartment command is input, the user interface is configured to display information about the plurality of sub-areas divided.

4. The cooking apparatus according to claim 3, wherein the user interface is configured to display information including a shape of each of the plurality of sub-areas.

5. The cooking apparatus according to claim 3, wherein the user interface is configured to display information including a set temperature level of each of the plurality of sub-areas.

6. The cooking apparatus according to claim 1, wherein the compartment command is among a plurality of compartment commands the user interface is configured to receive, and the plurality of compartment commands vary a number of the plurality of sub-areas to be divided.

7. The cooking apparatus according to claim 1, wherein, when the compartment command is input, the user interface is configured to receive a selection command for selecting any one of the plurality of sub-areas.

8. The cooking apparatus according to claim 1, wherein the cooking plate is printed with a compartment line that divides a cooking area border line and the cooking area into the plurality of sub-areas.

9. The cooking apparatus according to claim 1, wherein each of the plurality of induction heating coil groups is configured to include at least six induction heating coils.

10. The cooking apparatus according to claim 9, further comprising:
one circular induction heating coil configured to be driven independently of the plurality of induction heating coil groups,
wherein the one circular induction heating coil has a diameter of 140 mm or more.

11. A method of controlling a cooking apparatus, the method comprising:
receiving, by a user interface, a compartment command that is input requesting a partial area of one sub-area within a plurality of sub-areas of a cooking plate to be partially operated so that a partial portion of an induction heating coil group, among a plurality of induction heating coil groups, corresponding to the one sub-area is operated, the cooking apparatus including the plurality of induction heating coil groups at a bottom of the cooking plate to respectively correspond to each of the plurality of sub-areas;
determining, by a sub-assembly, the partial portion of the induction heating coil group, among the plurality of induction heating coil groups-based on placement of a cooking vessel when the compartment command is input; and
controlling a drive assembly, among a plurality of drive assemblies configured to respectively correspond to the plurality of induction heating coil groups, each drive assembly of the plurality of drive assemblies configured on a printed board assembly (PBA) that is separate from other drive assemblies of the plurality of drive assemblies, and each drive assembly of the plurality of drive assemblies respectively configured to supply a driving current to the corresponding induction heating coil group of the plurality of induction heating coil groups, to supply a respective driving current to the determined partial portion of the induction heating coil group such that a preset target temperature is distributed to the partial portion of the induction heating coil group, thereby operating the partial portion of the induction heating coil group.

12. The method according to claim 11, the determining of the induction heating coil group corresponding to the sub-area in which the cooking vessel is placed among the plurality of sub-areas comprises:
determining of the induction heating coil group corresponding to the sub-area in which the cooking vessel is placed by the sub-assembly separated from the plurality of drive assemblies.

13. The method according to claim 11, further comprising:
when the compartment command is input, displaying, by the user interface, information about the plurality of sub-areas divided.

14. The method according to claim 13, wherein the displaying of the information comprises:
displaying information including a shape of each of the plurality of sub-areas.

15. The method according to claim 13, wherein the displaying of the information comprises:
displaying information including a set temperature level of each of the plurality of sub-areas.

16. The method according to claim 11, wherein the receiving of the compartment command comprises:
receiving any one of a plurality of compartment commands that vary a number of the sub-areas to be divided.

17. The method according to claim 11, further comprising:
when the compartment command is input, receiving, by the user interface, a selection command for selecting any one of the plurality of sub-areas.

18. The method according to claim 11, wherein the cooking plate is printed with a compartment line that divides a cooking area border line and a cooking area into the plurality of sub-areas.

19. The method according to claim 11, wherein each of the plurality of induction heating coil groups includes at least six induction heating coils.

* * * * *